(12) United States Patent
Nidaira et al.

(10) Patent No.: US 11,868,563 B2
(45) Date of Patent: Jan. 9, 2024

(54) TOUCH PANEL DEVICE, TOUCH PANEL CONTROL METHOD, AND STORAGE MEDIUM STORING TOUCH PANEL CONTROL PROGRAM

(71) Applicant: Mitsubishi Electric Corporation, Tokyo (JP)

(72) Inventors: Masaya Nidaira, Tokyo (JP); Yuichi Sasaki, Tokyo (JP); Takeshi Ono, Tokyo (JP); Seiichiro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/680,736

(22) Filed: Feb. 25, 2022

(65) Prior Publication Data

US 2022/0179515 A1 Jun. 9, 2022

Related U.S. Application Data

(63) Continuation of application No. PCT/JP2019/034682, filed on Sep. 4, 2019.

(51) Int. Cl.
*G06F 3/041* (2006.01)
*G06F 3/044* (2006.01)

(52) U.S. Cl.
CPC .......... *G06F 3/0418* (2013.01); *G06F 3/0447* (2019.05)

(58) Field of Classification Search
CPC .... G06F 3/0418; G06F 3/0447; G06F 3/0443; G06F 2203/04105
See application file for complete search history.

(56) References Cited

U.S. PATENT DOCUMENTS

| | | | |
|---|---|---|---|
| 10,174,224 B2* | 1/2019 | Yoon | G06F 1/1643 |
| 10,551,969 B2* | 2/2020 | Jeong | G06F 3/0418 |
| 11,537,246 B2* | 12/2022 | Mori | G06F 3/0446 |
| 11,592,949 B2* | 2/2023 | Hashiguchi | G06F 3/0447 |

(Continued)

FOREIGN PATENT DOCUMENTS

| | | |
|---|---|---|
| JP | 2011-48425 A | 3/2011 |
| JP | 2012-43275 A | 3/2012 |

(Continued)

*Primary Examiner* — Benyam Ketema
(74) *Attorney, Agent, or Firm* — Birch, Stewart, Kolasch & Birch, LLP

(57) ABSTRACT

A touch panel device includes a cover panel that has an operation surface and bends corresponding to a depressing force applied to the operation surface; a touch sensor unit including touch sensor electrodes that output touch sensor signals; an elastic member that has a dielectric constant changing corresponding to a temperature and deforms due to the bending of the cover panel, the elastic member including an adhesive agent provided between the cover panel and the touch sensor unit; a first sensor unit that detects a capacitance changing depending on the dielectric constant and a thickness of the elastic member; and processing circuitry to estimate the temperature based on the capacitance detected by the first sensor unit; to detect the depressing force based on the estimated temperature and the capacitance detected by the first sensor unit; and to execute processing of the touch sensor signals based on the detected depressing force.

17 Claims, 26 Drawing Sheets

(56) References Cited

U.S. PATENT DOCUMENTS

| | | | |
|---|---|---|---|
| 2008/0225015 A1* | 9/2008 | Hashida | G06F 3/0443 345/173 |
| 2010/0080991 A1* | 4/2010 | Kishioka | C09J 143/04 428/355 R |
| 2011/0018826 A1* | 1/2011 | Shoji | G06F 3/0445 345/173 |
| 2011/0157087 A1* | 6/2011 | Kanehira | G06F 3/0447 345/174 |
| 2012/0044013 A1* | 2/2012 | Muranaka | G06F 3/0418 327/517 |
| 2013/0150132 A1 | 6/2013 | Izumi et al. | |
| 2014/0320762 A1* | 10/2014 | Jeong | G06F 3/041 445/24 |
| 2014/0354617 A1* | 12/2014 | Nam | G06F 3/04144 345/212 |
| 2015/0029130 A1* | 1/2015 | Collins | G06F 3/0446 345/174 |
| 2015/0338963 A1* | 11/2015 | Lee | G06F 3/0446 345/174 |
| 2015/0370376 A1* | 12/2015 | Harley | G06F 3/0447 345/174 |
| 2016/0018893 A1* | 1/2016 | Choi | G06F 3/044 345/177 |
| 2016/0070398 A1* | 3/2016 | Worfolk | G06F 3/0446 345/174 |
| 2016/0103544 A1* | 4/2016 | Filiz | G06F 3/0412 345/174 |
| 2016/0216833 A1* | 7/2016 | Butler | G06F 3/0412 |
| 2017/0168650 A1* | 6/2017 | Lee | G06F 3/04166 |
| 2018/0004333 A1* | 1/2018 | Jeong | G06F 3/0416 |
| 2018/0107302 A1* | 4/2018 | Takada | G02B 6/0056 |
| 2019/0102003 A1* | 4/2019 | Gur | G06F 3/041661 |
| 2020/0285366 A1* | 9/2020 | Agari | G06F 3/0448 |
| 2022/0179515 A1* | 6/2022 | Nidaira | G06F 3/0443 |

FOREIGN PATENT DOCUMENTS

| | | |
|---|---|---|
| JP | 2012-48340 A | 3/2012 |
| JP | 2013-114326 A | 6/2013 |
| JP | 2013-246557 A | 12/2013 |
| JP | 2018-63234 A | 4/2018 |

* cited by examiner

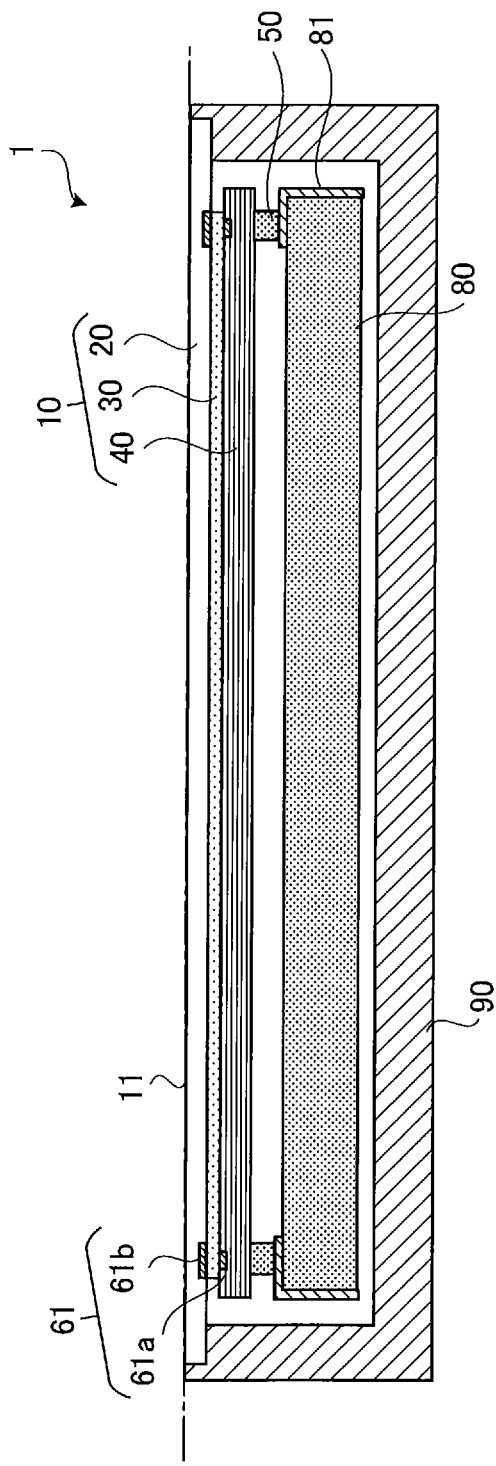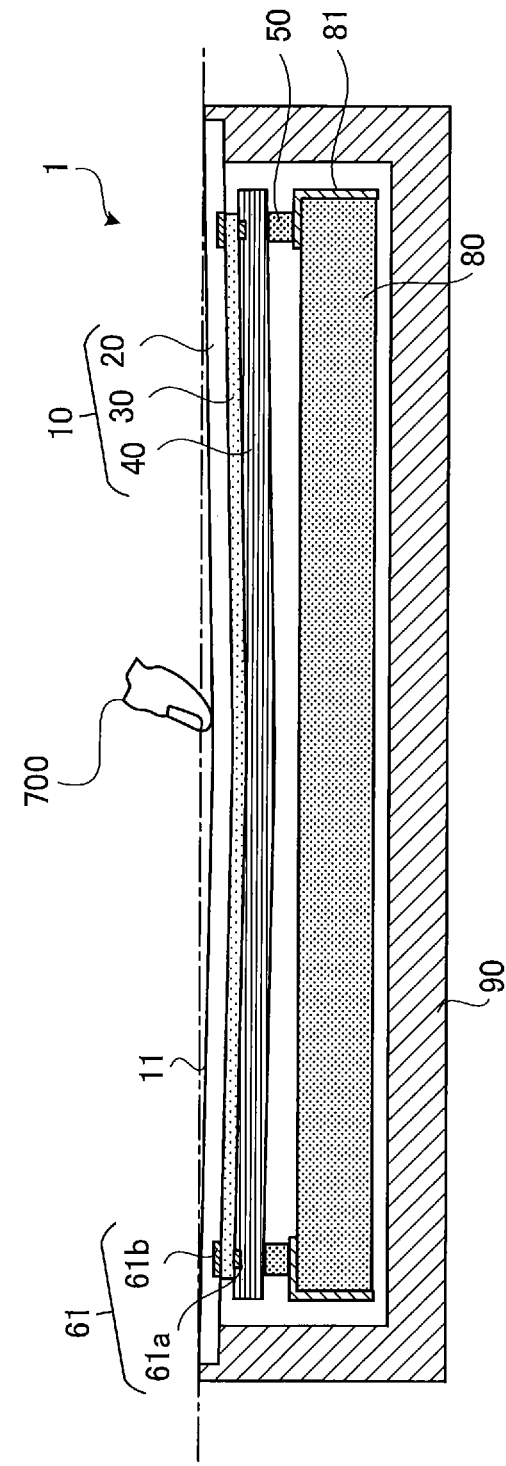

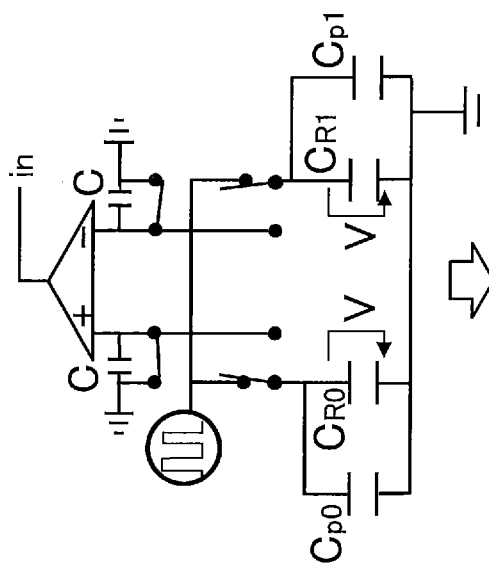
FIG.16A
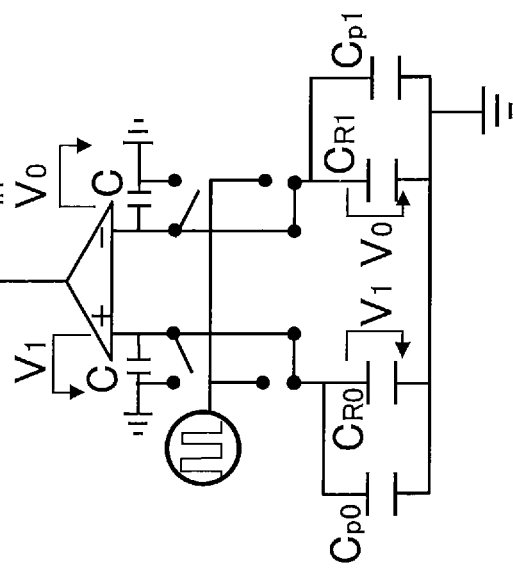
FIG.16B
FIG.16C

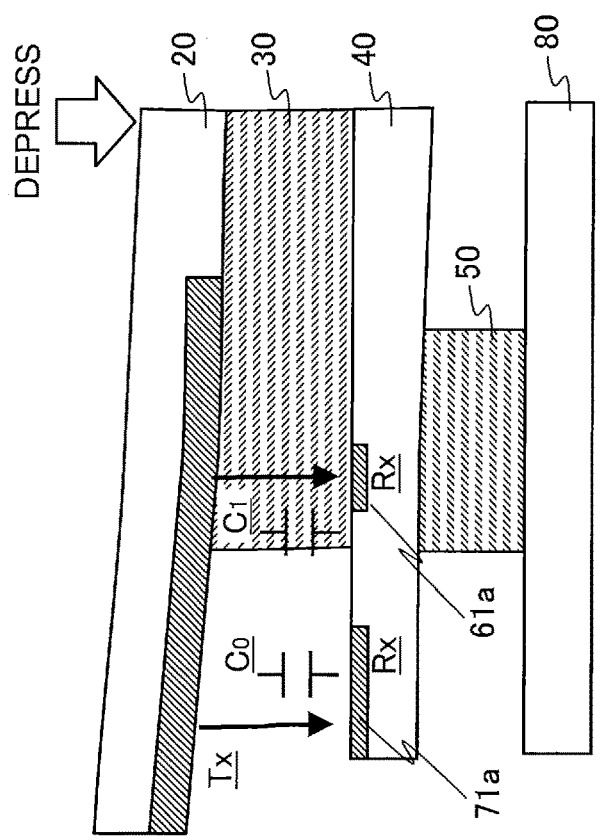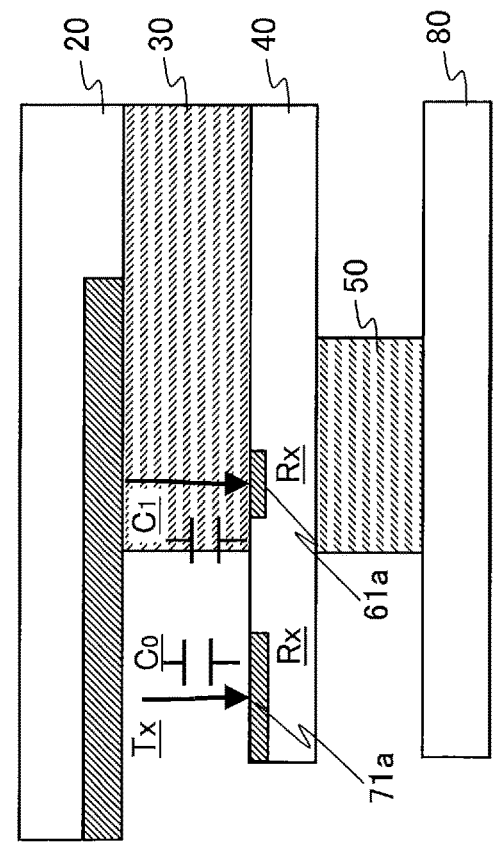

TOUCH PANEL DEVICE, TOUCH PANEL CONTROL METHOD, AND STORAGE MEDIUM STORING TOUCH PANEL CONTROL PROGRAM

CROSS-REFERENCE TO RELATED APPLICATION

This application is a continuation application of International Application No. PCT/JP2019/034682 having an international filing date of Sep. 4, 2019.

BACKGROUND OF THE INVENTION

1. Field of the Invention

The present disclosure relates to a touch panel device, a touch panel control method and a touch panel control program.

2. Description of the Related Art

There has been proposed a touch panel device that turns on a contact point at a position of depression in response to a touch operation performed with a depressing force applied to an operation surface of the touch panel. See Patent Reference 1, i.e., Japanese Patent Application Publication No. 2011-048425 (e.g., paragraph 0074), for example.

However, in a touch panel device, there are cases where a property (e.g., viscosity or rigidity) of an elastic member constituting a part of the touch panel changes due to temperature variations. In such cases, a situation where no touch operation is detected even when the user has performed a touch operation with the application of a depressing force, or a situation where a finger contact not intending a touch operation is detected as a touch operation, becomes more likely to occur to the touch panel device. Namely, an erroneous judgment on a touch operation becomes more likely to occur due to temperature variations.

SUMMARY OF THE INVENTION

An object of the present disclosure, which has been made to resolve the above-described problem with the conventional technology, is to provide a touch panel device, a touch panel control method and a touch panel control program capable of inhibiting the occurrence of the erroneous judgment on a touch operation due to temperature variations.

A touch panel device according to an aspect of the present disclosure includes a cover panel that has an operation surface on which a touch operation is performed and bends corresponding to a depressing force applied to the operation surface; a touch sensor unit including touch sensor electrodes that output touch sensor signals corresponding to the touch operation; an elastic member that has a dielectric constant changing corresponding to a temperature and deforms due to the bending of the cover panel, the elastic member including an adhesive agent provided between the cover panel and the touch sensor unit; a first sensor unit that detects a capacitance changing depending on the dielectric constant and a thickness of the elastic member; and processing circuitry to estimate the temperature based on the capacitance detected by the first sensor unit; to detect the depressing force based on the estimated temperature and the capacitance detected by the first sensor unit; and to execute processing of the touch sensor signals based on the detected depressing force.

A touch panel control method according to another aspect of the present disclosure is a touch panel control method executed by a touch panel device that includes a cover panel that has an operation surface on which a touch operation is performed and bends corresponding to a depressing force applied to the operation surface, a touch sensor unit including touch sensor electrodes that output touch sensor signals corresponding to the touch operation, an elastic member that has a dielectric constant changing corresponding to a temperature and deforms due to the bending of the cover panel, the elastic member including an adhesive agent provided between the cover panel and the touch sensor unit, and a first sensor unit that detects a capacitance changing depending on the dielectric constant and a thickness of the elastic member. The method includes estimating the temperature based on the capacitance detected by the first sensor unit; detecting the depressing force based on the estimated temperature and the capacitance detected by the first sensor unit; and executing processing of the touch sensor signals based on the detected depressing force.

According to the present disclosure, it is possible to inhibit the occurrence of the erroneous judgment on a touch operation due to temperature variations.

BRIEF DESCRIPTION OF THE DRAWINGS

In the attached drawings,

FIGS. 1A and 1B are cross-sectional views schematically showing the structure of a touch panel device according to a first embodiment of the present disclosure;

FIG. 16A is a cross-sectional view schematically showing the structure of a touch panel device according to a third embodiment of the present disclosure, and FIGS. 16B and 16C are diagrams showing a differential circuit included in a dielectric constant comparison unit;

FIGS. 18A and 18B are cross-sectional views schematically showing the structure of the touch panel device according to the third embodiment;

DETAILED DESCRIPTION OF THE INVENTION

Touch panel devices, touch panel control methods and touch panel control programs according to embodiments of the present disclosure will be described below with reference to the drawings. The following embodiments are just examples and a variety of modifications are possible within the scope of the present disclosure.

(1) First Embodiment

FIGS. 1A and 1B are cross-sectional views schematically showing the structure of a touch panel device 1 according to a first embodiment. FIG. 1A shows a state in which no touch operation is being performed on an operation surface 11 of the touch panel device 1. FIG. 1B shows a state in which a touch operation is being performed while applying a depressing force to the operation surface 11 of the touch panel device 1 with a finger 700.

Figure 2:
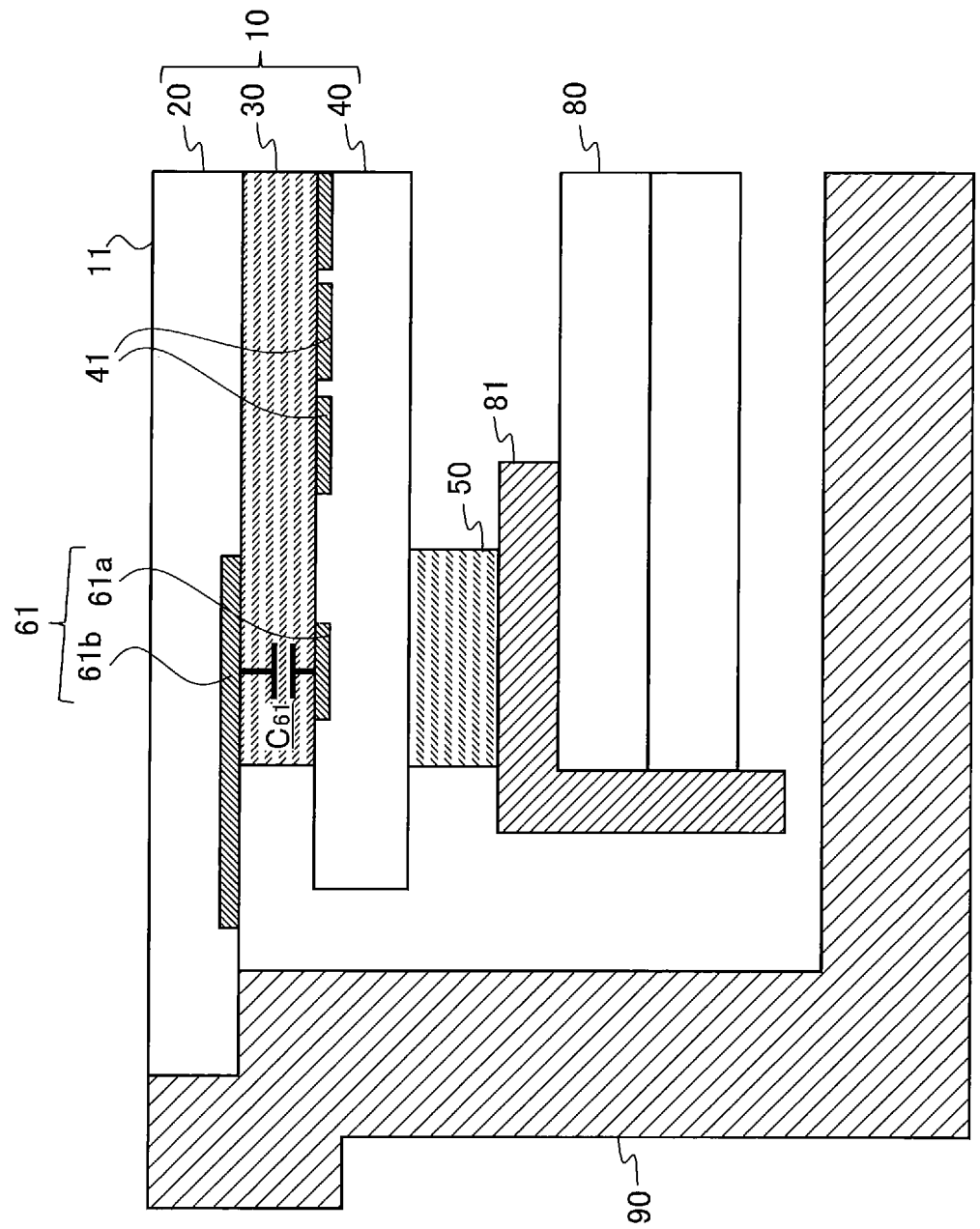
FIG. 2 is an enlarged sectional view schematically showing the structure of a principal part of the touch panel device according to the first embodiment.
Figure 3:
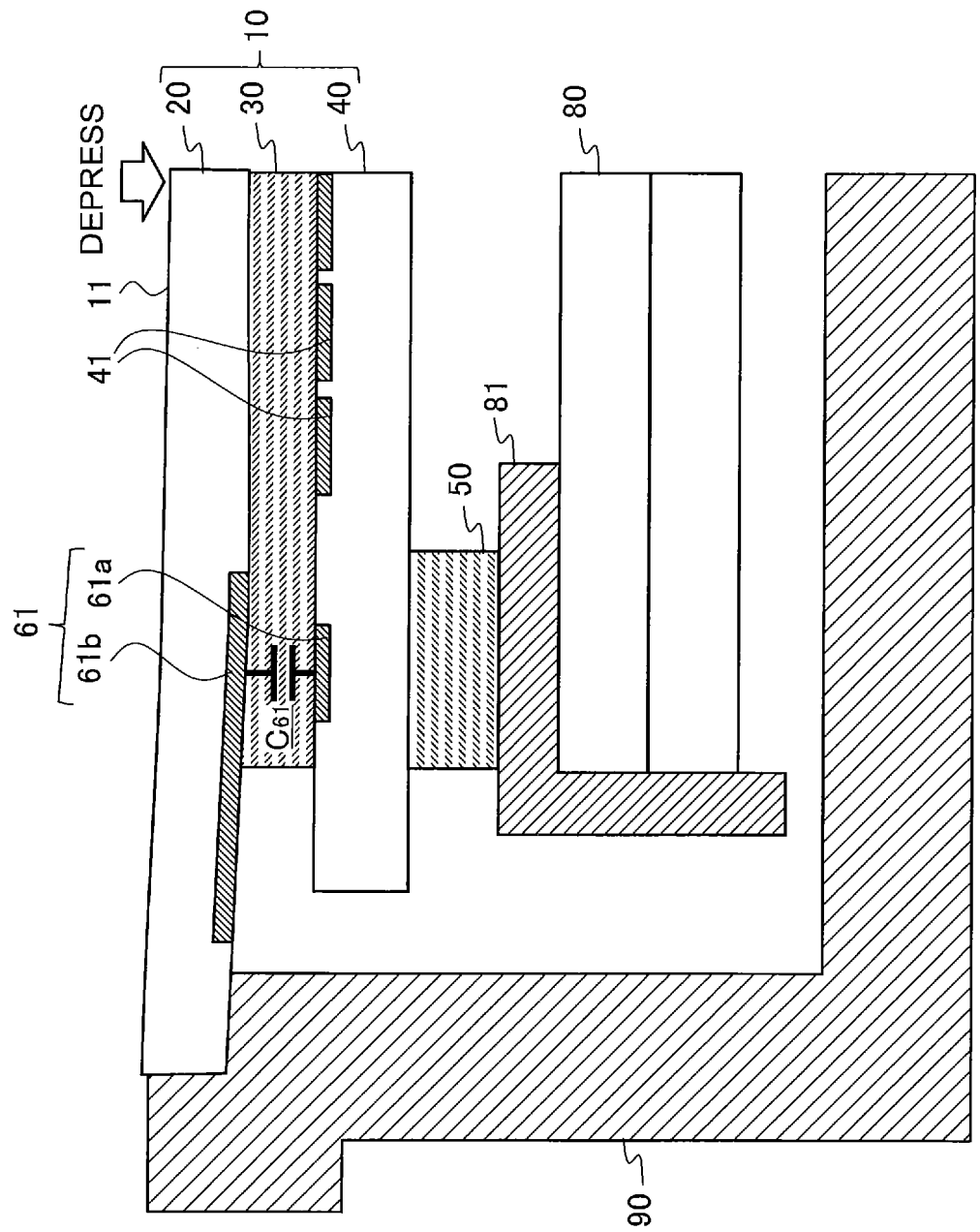
FIG. 3 is an enlarged sectional view schematically showing the structure of the principal part of the touch panel device according to the first embodiment.
Figure 4:
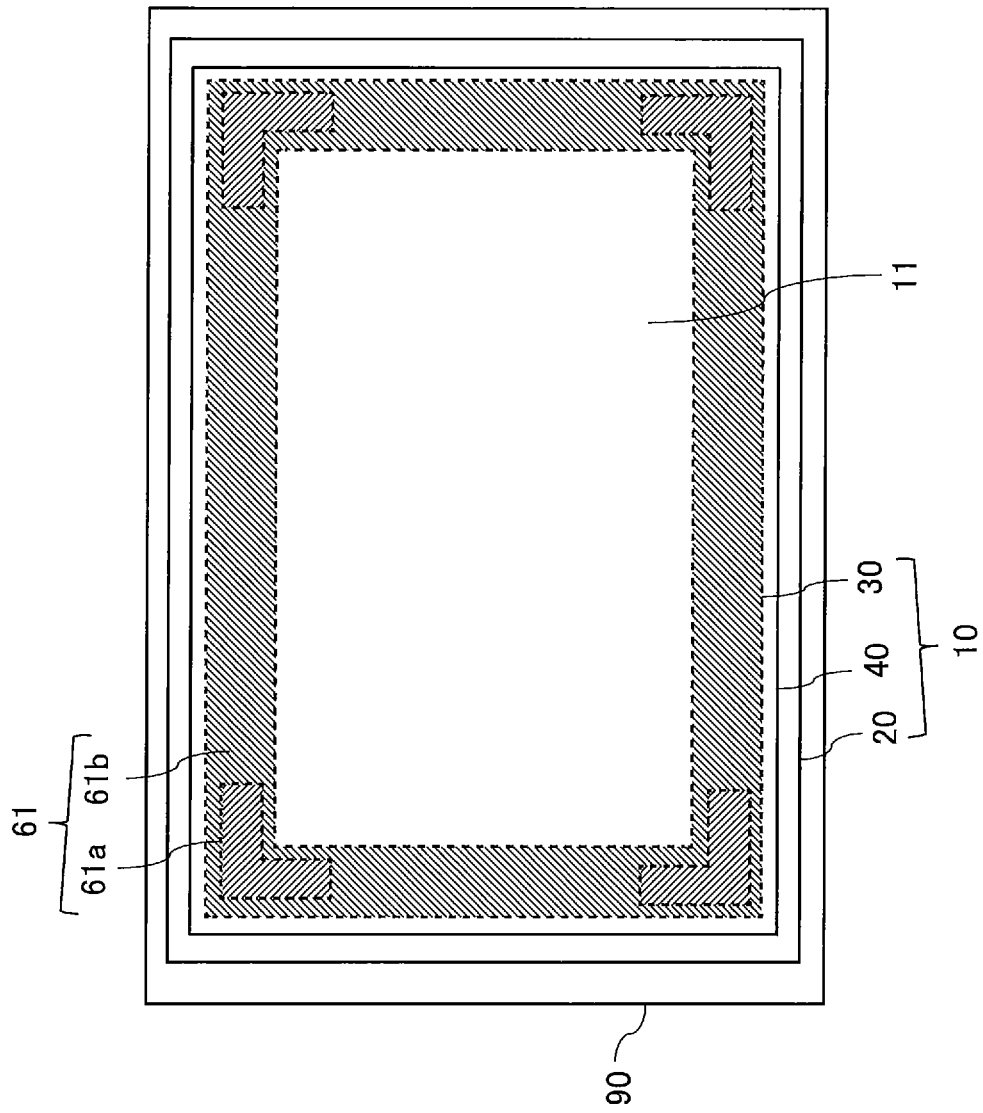
FIG. 4 is a plan view schematically showing the touch panel device according to the first embodiment.

FIG. 2 is an enlarged sectional view schematically showing the structure of a principal part of the touch panel device 1. FIG. 2 shows a state in which no touch operation is being performed on the operation surface 11 of the touch panel device 1. FIG. 3 is an enlarged sectional view schematically showing the structure of the principal part of the touch panel device 1. FIG. 3 shows a state in which a touch operation is being performed while applying a depressing force to the operation surface 11 of the touch panel device 1. FIG. 4 is a plan view schematically showing the touch panel device 1.

The touch panel device 1 includes a cover panel 20, a touch sensor unit 40, an adhesive agent 30 as an elastic member, and a first sensor unit 61. The cover panel 20 and the touch sensor unit 40 are bonded to each other by the adhesive agent 30. The cover panel 20, the touch sensor unit 40 and the adhesive agent 30 constitute a touch panel unit 10.

Further, the touch panel device 1 includes a display panel unit 80, a frame 81 included in the display panel unit 80, and an elastic material 50 as an elastic member provided between the display panel unit 80 and the touch panel unit 10. The elastic material 80 is a dielectric substance.

The cover panel 20 has the operation surface 11 on which a touch operation is performed by use of an electric conductor such as the finger 700. As shown in FIGS. 1B and 3, the cover panel 20 bends corresponding to the depressing force applied to the operation surface 11. In other words, the whole of the cover panel 20 slightly curves corresponding to the depressing force applied to the operation surface 11. The cover panel 20 is transparent glass, for example. The cover panel 20 is referred to also as protective glass. Further, the cover panel 20 is supported by a housing 90. The structure in which the cover panel 20 is fixed to the housing 90 is referred to also as compression mount structure.

As shown in FIG. 2 and FIG. 3, the touch sensor unit 40 is a touch sensor panel which is a plate-like device, for example. The touch sensor unit 40 includes a plurality of touch sensor electrodes 41 that output touch sensor signals corresponding to a touch operation performed by use of an electric conductor. The touch sensor signal is a signal corresponding to an electrostatic capacitance of a touch sensor electrode 41 changed by the touch operation. The touch sensor electrode 41 is formed with ITO (Indium Tin Oxide) being a transparent electrode, for example.

The adhesive agent 30 is a dielectric substance. The dielectric constant of the adhesive agent 30 changes corresponding to the temperature. The adhesive agent 30 is an elastic member that deforms due to the bending of the cover panel 20. The adhesive agent 30 can also be an adhesive sheet.

The first sensor unit 61 is a first sensor set including one or more capacitance sensors. The first sensor unit 61 includes a first capacitance sensor that detects a capacitance $C_{61}$ that changes depending on the dielectric constant of the adhesive agent 30 and the thickness of the adhesive agent 30. The first sensor unit 61 includes a first displacement detection electrode 61a and a second displacement detection electrode 61b arranged at positions to face each other across the adhesive agent 30. The first displacement detection electrode 61a and the second displacement detection electrode 61b are formed with ITO, for example. The first displacement detection electrode 61*a* is arranged on a surface of the touch sensor unit 40 on the adhesive agent 30's side. The second displacement detection electrode 61*b* is arranged on a surface of the cover panel 20 on the adhesive agent 30's side. In the example of FIG. 4, the first sensor unit 61 includes four first capacitance sensors. However, the number of first capacitance sensors is not limited to four.

The display panel unit 80 displays an image that is visible through the touch panel unit 10. The display panel unit 80 displays an image such as a GUI (Graphical User Interface), for example. The display panel unit 80 is, for example, a liquid crystal panel unit including a liquid crystal display and a backlight unit.

Figure 5:
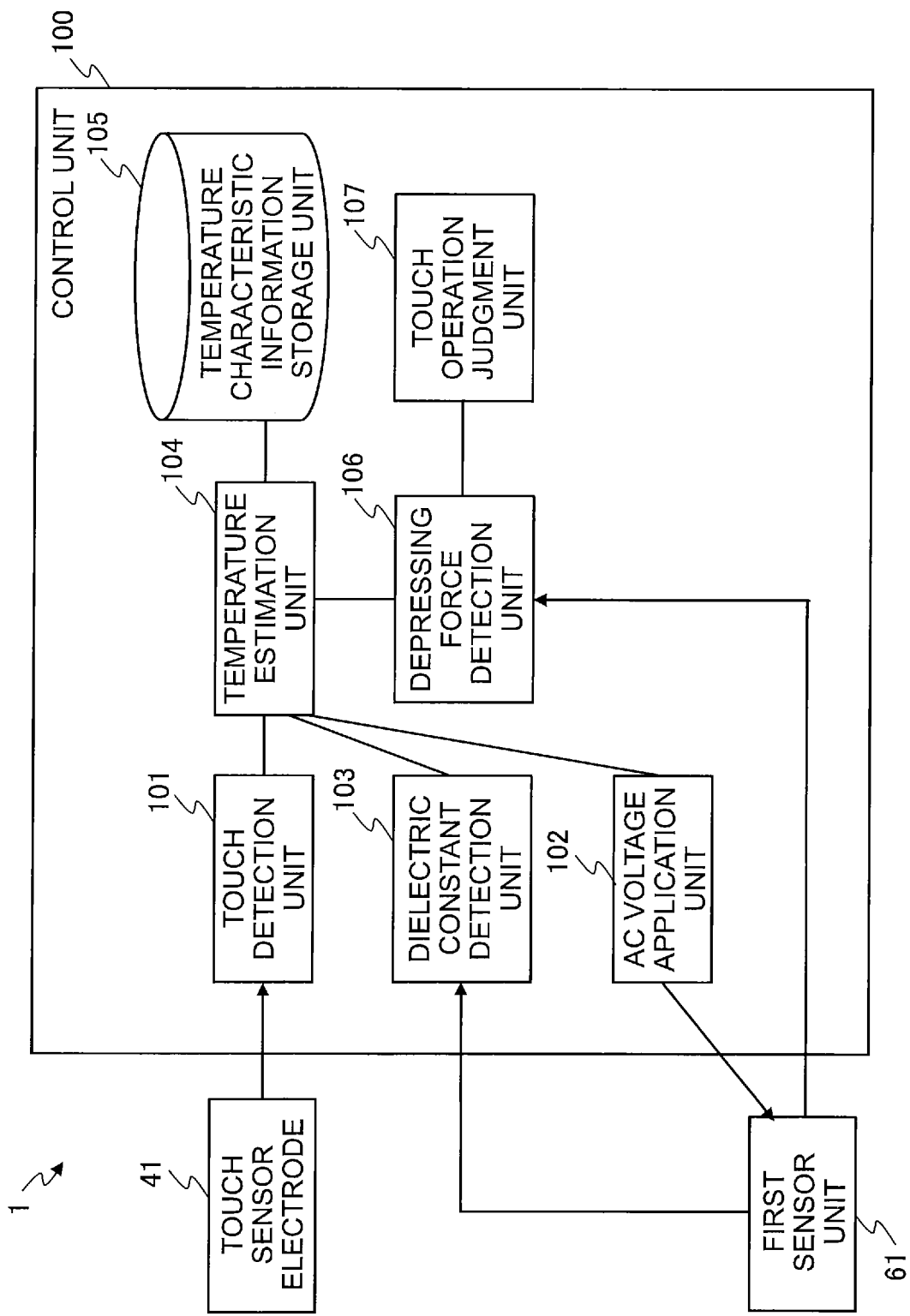
FIG. 5 is a functional block diagram schematically showing the configuration of a control unit of the touch panel device according to the first embodiment.

FIG. 5 is a functional block diagram schematically showing the configuration of a control unit 100 of the touch panel device 1. The touch panel device 1 includes the control unit 100. The control unit 100 is capable of executing a touch panel control method according to the first embodiment. The control unit 100 can also be a part of an information processing device such as a computer that executes a touch panel control program according to the first embodiment.

The control unit 100 includes a touch detection unit 101, an AC voltage application unit 102, a dielectric constant detection unit 103, a temperature estimation unit 104, a temperature characteristic information storage unit 105, a depressing force detection unit 106 and a touch operation judgment unit 107. The temperature characteristic information storage unit 105 may also be included in an external device different from the touch panel device 1.

The touch detection unit 101 receives a plurality of touch sensor signals outputted from a plurality of touch sensor electrodes 41 and provides the temperature estimation unit 104 with a touch detection signal based on the plurality of touch sensor signals. The touch detection signal includes, for example, a coordinate signal indicating a touch position as the position of the touch operation on the operation surface 11.

The AC voltage application unit 102 supplies an AC voltage at a predetermined frequency to the first displacement detection electrode 61*a* of the first sensor unit 61.

The dielectric constant detection unit 103 obtains the dielectric constant from the detection value of the capacitance $C_{61}$ outputted from the first sensor unit 61 and supplies the temperature estimation unit 104 with a signal indicating the dielectric constant of the adhesive agent 30 being the elastic member.

The temperature estimation unit 104 estimates the temperature of the adhesive agent 30 based on the capacitance $C_{61}$ detected by the first sensor unit 61. In the example of FIG. 5, the temperature estimation unit 104 estimates the temperature of the adhesive agent 30 based on the dielectric constant calculated based on the detection value of the capacitance $C_{61}$ outputted from the first sensor unit 61. In the estimation of the temperature of the adhesive agent 30, temperature characteristic information previously stored in the temperature characteristic information storage unit 105 is referred to. The temperature characteristic information is, for example, information indicating a correspondence relationship between the dielectric constant and the temperature.

The depressing force detection unit 106 detects (e.g., calculates) the depressing force based on the temperature estimated by the temperature estimation unit 104 and the capacitance $C_{61}$ detected by the first sensor unit 61. Specifically, when the depressing force detection unit 106 detects (e.g., calculates) the depressing force based on the capacitance $C_{61}$ detected by the first sensor unit 61, the depressing force detection unit 106 outputs a depressing force corrected by using the temperature estimated by the temperature estimation unit 104.

The touch operation judgment unit 107 executes processing of the touch sensor signals by using the depressing force outputted from the depressing force detection unit 106. For example, the touch operation judgment unit 107 judges whether or not the touch operation is a touch operation with a depressing force greater than or equal to a predetermined reference value. Specifically, the touch operation judgment unit 107 judges that the touch operation is a valid touch operation when the touch operation is a touch operation with a depressing force greater than or equal to the predetermined reference value, and judges that the touch operation is an invalid touch operation when the depressing force at the time when the touch operation is performed is less than the predetermined reference value.

The reason why the depressing force detection unit 106 refers to the temperature estimated by the temperature estimation unit 104 is that a property (e.g., rigidity or elasticity) of the adhesive agent 30 being the elastic member changes depending on the temperature. In general, the adhesive agent 30 becomes more likely to be deformed with the increase in the temperature. Namely, even if the same depressing force is applied, the deformation of the adhesive agent 30 when the temperature is low is slight and the deformation of the adhesive agent 30 when the temperature is high is great. Further, the dielectric constant of the adhesive agent 30 being the elastic member changes depending on the temperature. Therefore, in the first embodiment, the dielectric constant of the adhesive agent 30 is detected by the dielectric constant detection unit 103 and the first sensor unit 61 as a depressing force sensor and the temperature of the adhesive agent 30 is estimated by the temperature estimation unit 104 from the detected dielectric constant. Further, the depressing force detection unit 106 outputs a depressing force corrected by using the temperature estimated by the temperature estimation unit 104.

Figure 6:
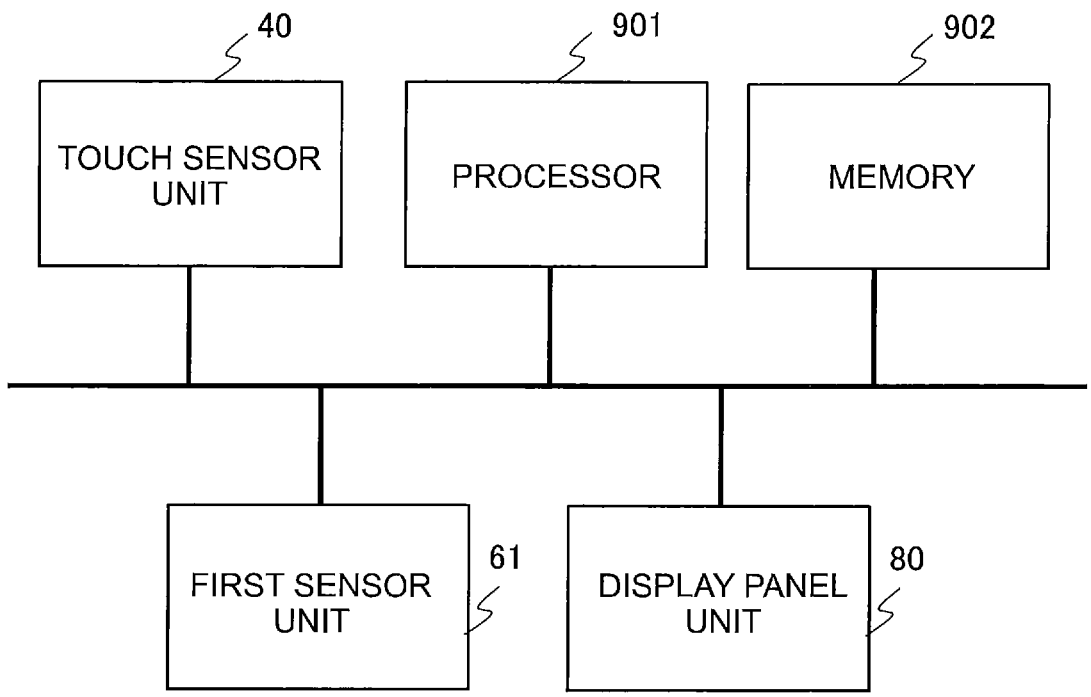
FIG. 6 is a diagram showing an example of the hardware configuration of the touch panel device according to the first embodiment.

FIG. 6 is a diagram showing an example of the hardware configuration of the touch panel device 1. The touch panel device 1 includes a memory 902 capable of storing a program and a processor 901 as an information processing unit that executes the program. The program includes the touch panel control program according to the first embodiment. The program can be provided by using a record medium for storing information. Further, as already explained earlier, the touch panel device 1 includes the touch sensor unit 40 having a plurality of touch sensor electrodes, the first sensor unit 61 having the functions as the depressing force sensor and a dielectric constant sensor, and the display panel unit 80. The control unit 100 shown in FIG. 5 can be implemented by using the memory 902 as a storage device storing the program as software and the processor 901 as the information processing unit that executes the program stored in the memory 902. The storage device may be a non-transitory computer-readable storage medium storing a program such as the authoring program. The processor 901 can also be a part of an information processing device such as a computer, for example.

Figure 7:
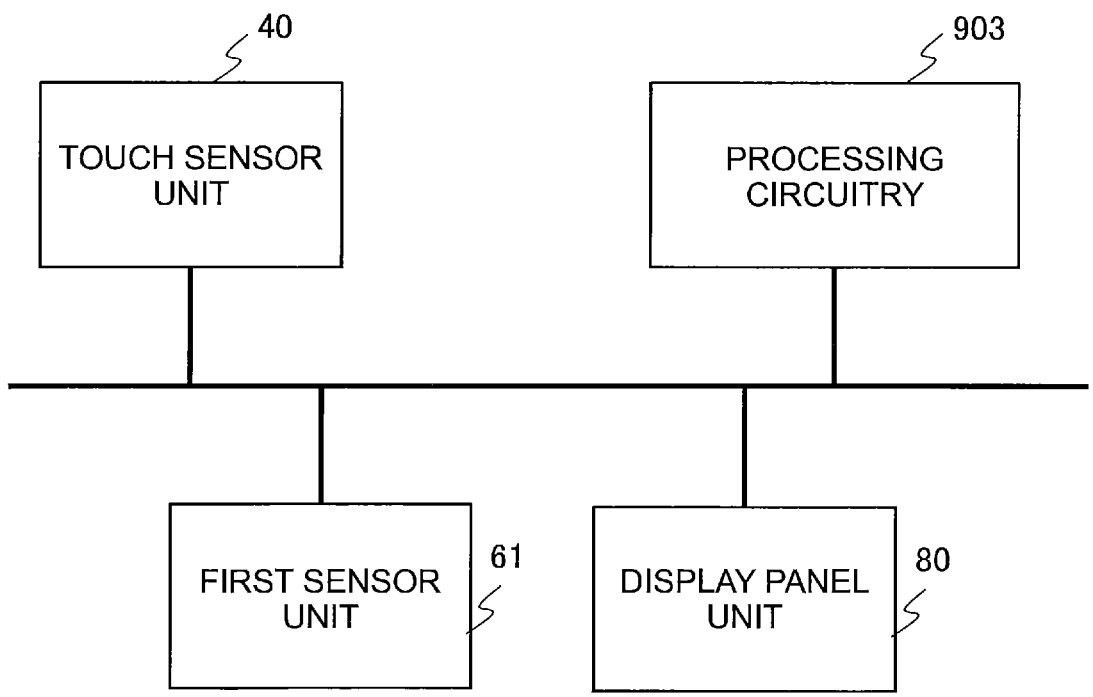
FIG. 7 is a diagram showing another example of the hardware configuration of the touch panel device according to the first embodiment.

FIG. 7 is a diagram showing another example of the hardware configuration of the touch panel device 1. The touch panel device 1 includes processing circuitry 903. The control unit 100 shown in FIG. 5 can be implemented by the processing circuitry 903. Incidentally, it is also possible to implement a part of the control unit 100 shown in FIG. 5 by using processing circuitry and implement the remaining part of the control unit 100 by using the memory 902 and the processor 901 shown in FIG. 6.

FIG. 3 is a flowchart showing the operation of the touch panel device 1. In step S11, the dielectric constant detection unit 103 detects the dielectric constant of the adhesive agent 30 based on the capacitance $C_{61}$ detected by the first sensor unit 61 and provides the temperature estimation unit 104 with the detected dielectric constant. In the next step S12, the temperature estimation unit 104 estimates the temperature of the adhesive agent 30 based on the received dielectric constant and the temperature characteristic information and provides the depressing force detection unit 106 with the estimated temperature. In the next step S13, the depressing force detection unit 106 detects the depressing force based on the capacitance $C_{61}$ detected by the first sensor unit 61 at the time of the touch operation and the received temperature. In the next step S14, the touch operation judgment unit 107 executes the processing of the touch sensor signals based on the detected depressing force. For example, the touch operation judgment unit 107 executes a process of judging whether or not the detected depressing force is greater than or equal to a predetermined threshold value and executes a process based on the result of the judgment.

As described above, with the touch panel device 1 according to the first embodiment, the detection error of the depressing force due to temperature variations can be reduced. Accordingly, the erroneous judgments in touch operations can be reduced even in cases where the temperature variations are great.

Figure 9:
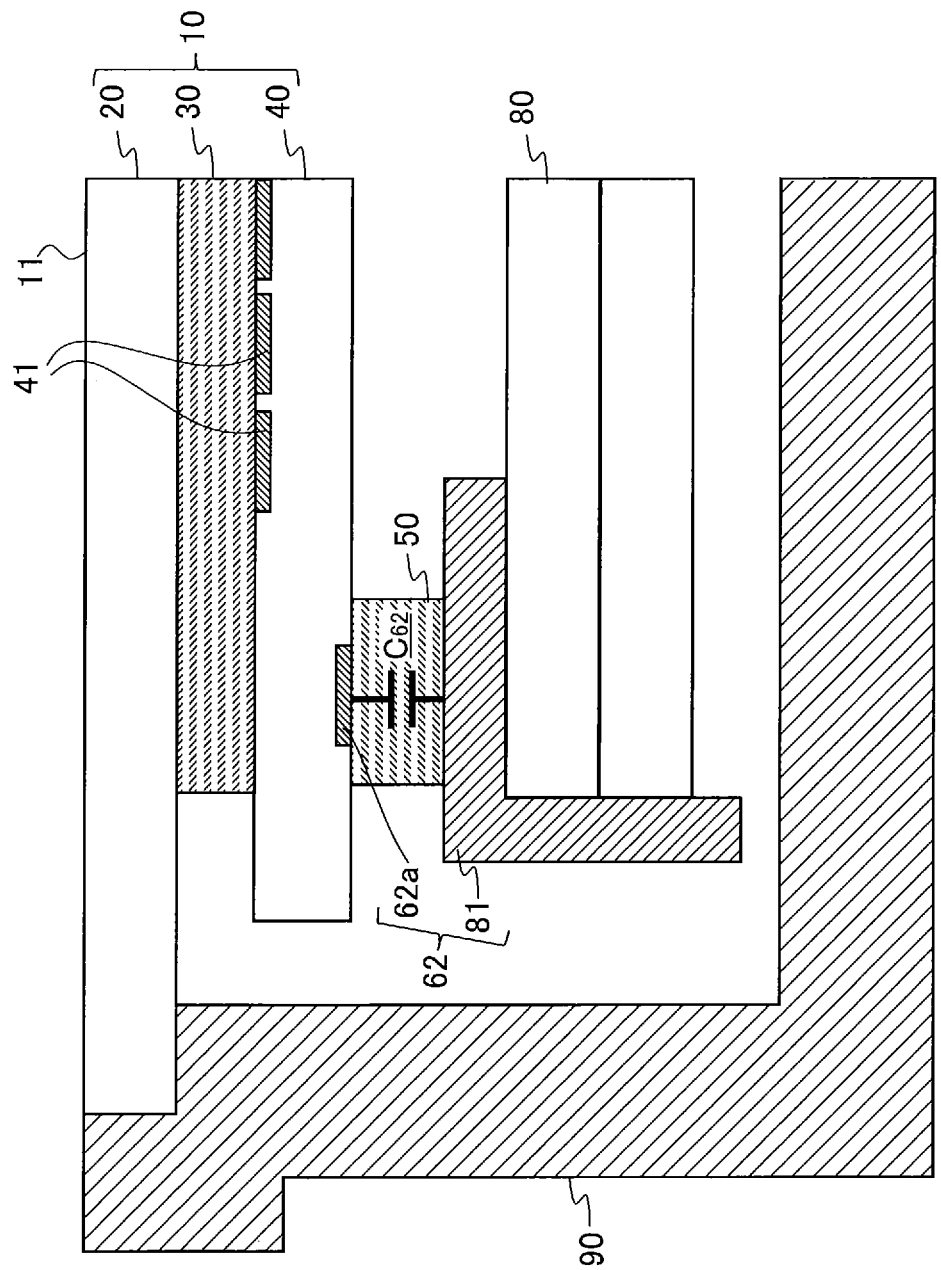
FIG. 9 is an enlarged sectional view schematically showing the structure of a principal part of a touch panel device according to a first modification of the first embodiment.

FIG. 9 is an enlarged sectional view schematically showing the structure of a principal part of a touch panel device according to a first modification of the first embodiment. In the example shown in FIG. 1 to FIG. 4, a case where the elastic member is the adhesive agent 30 is described. The example shown in FIG. 9 illustrates a case where the elastic member is the elastic material 50. The touch panel device shown in FIG. 9 includes a first sensor unit 62 instead of the first sensor unit 61 in FIG. 1 to FIG. 4. The first sensor unit 62 includes a first displacement detection electrode 62a and the frame 81 as a second displacement detection electrode 62b. Except for these features, the touch panel device shown in FIG. 9 is the same as the touch panel device shown in FIG. 1 to FIG. 4.

Figure 10:
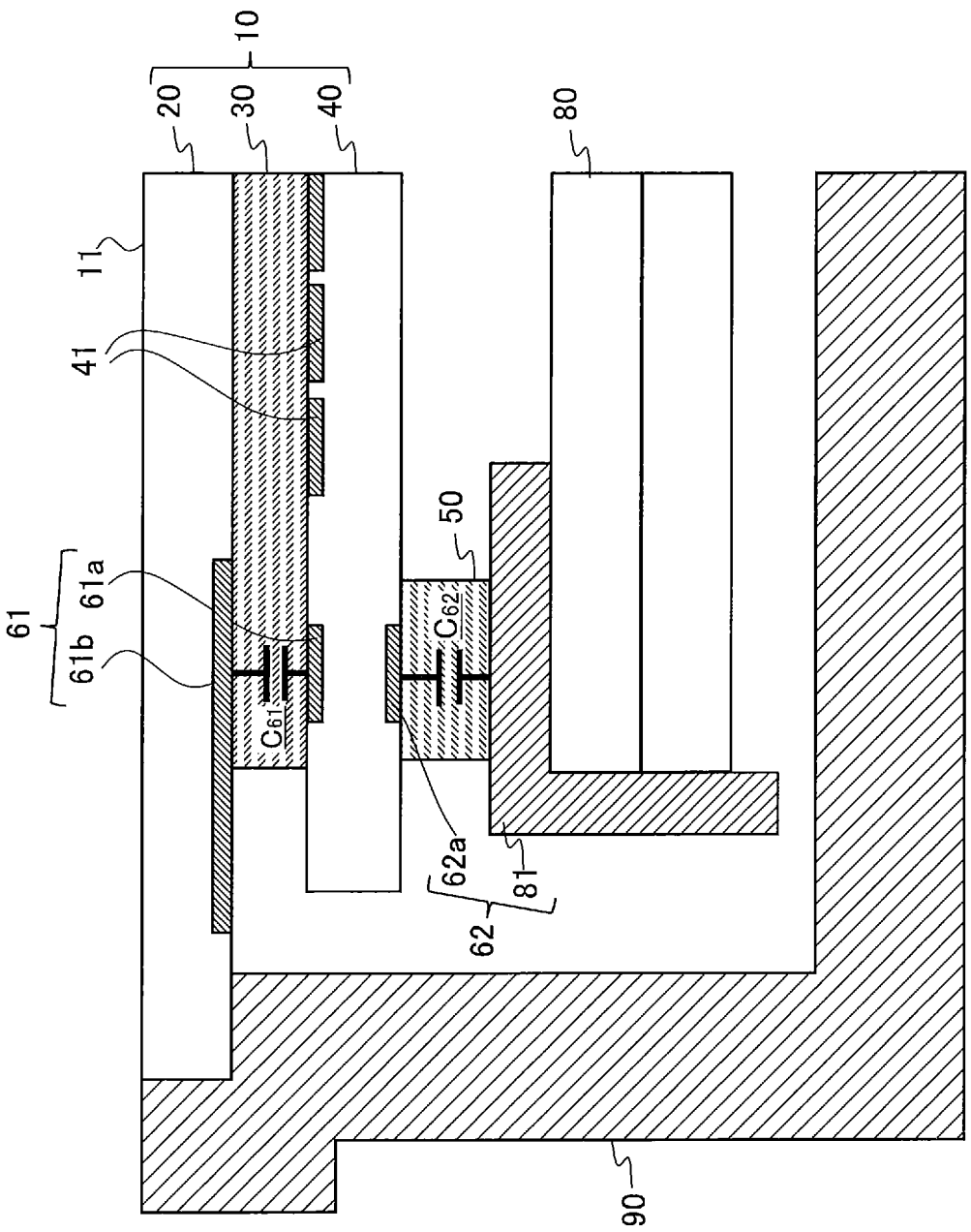
FIG. 10 is an enlarged sectional view schematically showing the structure of a principal part of a touch panel device according to a second modification of the first embodiment.

FIG. 10 is an enlarged sectional view schematically showing the structure of a principal part of a touch panel device according to a second modification of the first embodiment. In the example shown in FIG. 1 to FIG. 4, the case where the elastic member is the adhesive agent 30 is described. The example shown in FIG. 10 illustrates a case where the elastic member is the adhesive agent 30 and the elastic material 50. The touch panel device shown in FIG. 10 includes the first sensor unit 62 in addition to the first sensor unit 61 in FIG. 1 to FIG. 4. The first sensor unit 62 includes the first displacement detection electrode 62a and the frame 81 as the second displacement detection electrode. The dielectric constant detection unit 103 detects the dielectric constant based on a capacitance $C_{62}$ outputted from the first sensor unit 62. The depressing force detection unit 106 detects the depressing force based on the estimated temperature and the capacitance $C_{62}$ outputted from the first sensor unit 62. Except for these features, the touch panel device shown in FIG. 10 is the same as the touch panel device shown in FIG. 1 to FIG. 4.

Figure 11:
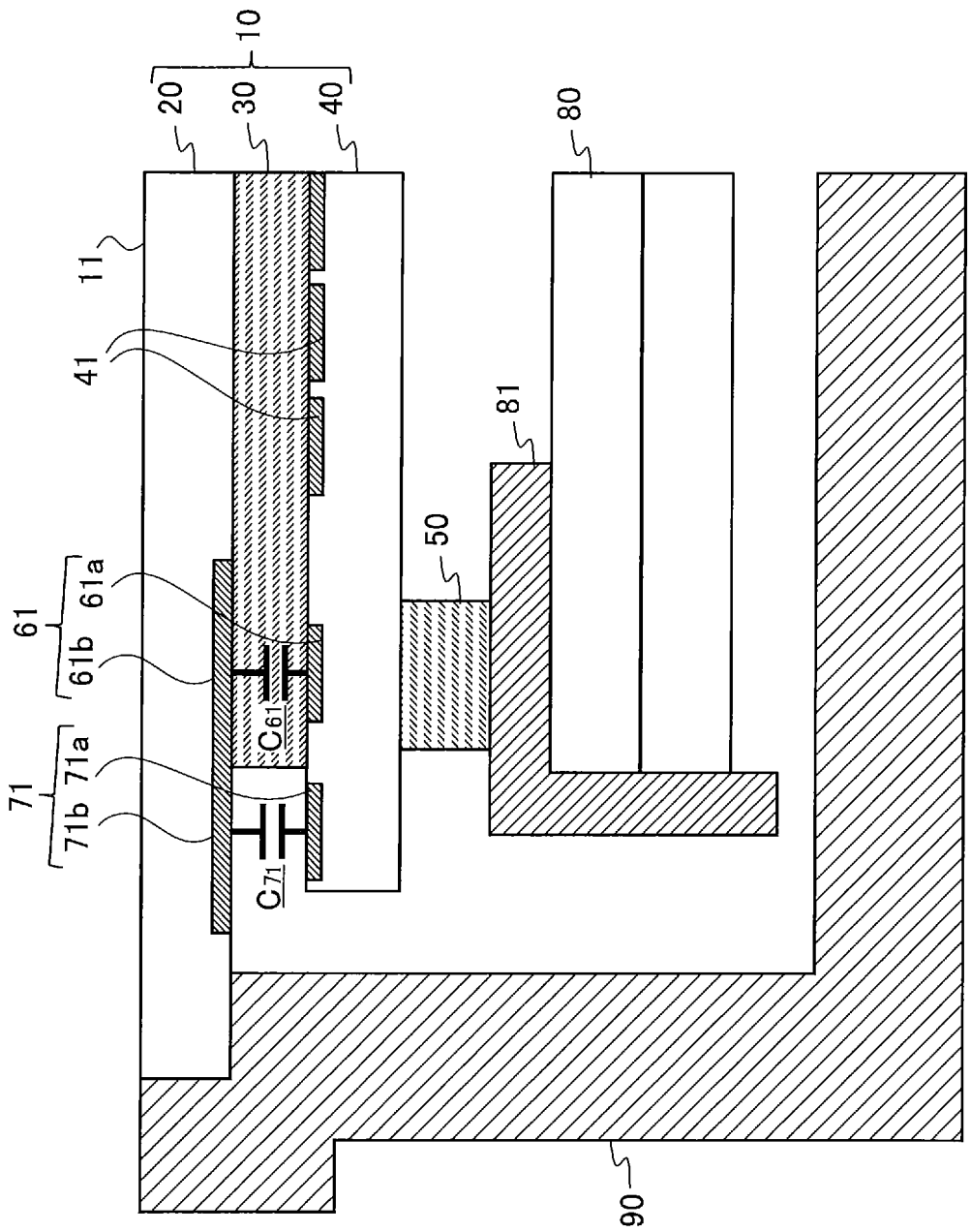
FIG. 11 is an enlarged sectional view schematically showing the structure of a principal part of a touch panel device according to a third modification of the first embodiment.

FIG. 11 is an enlarged sectional view schematically showing the structure of a principal part of a touch panel device according to a third modification of the first embodiment. In the example shown in FIG. 1 to FIG. 4, the case where the elastic member is the adhesive agent 30 is described. The touch panel device shown in FIG. 11 includes a second sensor unit 71 having detection electrodes arranged to face each other across a space adjoining the adhesive agent 30 in addition to the first sensor unit 61 in FIG. 1 to FIG. 4. The second sensor unit 71 is a second sensor set including one or more capacitance sensors. The second sensor unit 71 includes a third displacement detection electrode 71a and a fourth displacement detection electrode 71b. The dielectric constant detection unit 103 detects the dielectric constant based on the capacitance $C_{61}$ outputted from the first sensor unit 61 and a capacitance $C_{71}$ outputted from the second sensor unit 71. The depressing force detection unit 106 detects the depressing force based on the estimated temperature, the capacitance $C_{61}$ outputted from the first sensor unit 61 and the capacitance $C_{71}$ outputted from the second sensor unit 71. Except for these features, the touch panel device shown in FIG. 11 is the same as the touch panel device shown in FIG. 1 to FIG. 4.

Figure 12:
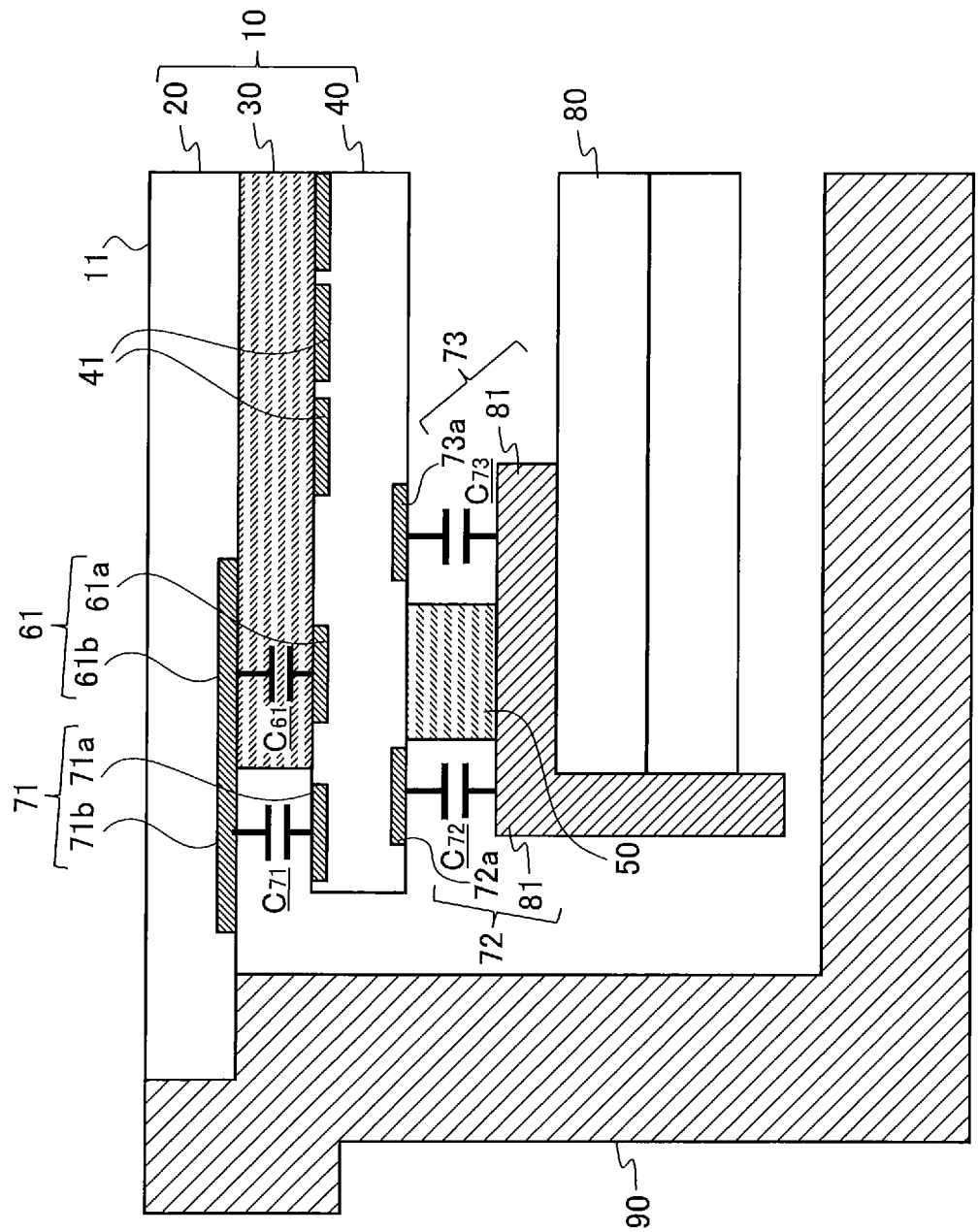
FIG. 12 is an enlarged sectional view schematically showing the structure of a principal part of a touch panel device according to a fourth modification of the first embodiment.

FIG. 12 is an enlarged sectional view schematically showing the structure of a principal part of a touch panel device according to a fourth modification of the first embodiment. The touch panel device shown in FIG. 12 includes third sensor units 72 and 73 in addition to the first sensor unit 61 and the second sensor unit 71. The third sensor unit 72 is a third sensor set including one or more capacitance sensors. The third sensor unit 72 includes a fifth displacement detection electrode 72a and the frame 81 as a sixth displacement detection electrode. The third sensor unit 73 is another third sensor set including one or more capacitance sensors. The third sensor unit 73 includes a seventh displacement detection electrode 73a and the frame 81 as an eighth displacement detection electrode. The dielectric constant detection unit 103 detects the dielectric constant based on the capacitance $C_{61}$ outputted from the first sensor unit 61, the capacitance $C_{71}$ outputted from the second sensor unit 71 and a capacitances $C_{72}$ and $C_{73}$ outputted from the third sensor units 72 and 73. The depressing force detection unit 106 detects the depressing force based on the estimated temperature, the capacitance $C_{61}$ outputted from the first sensor unit 61, the capacitance $C_{71}$ outputted from the second sensor unit 71 and the capacitances $C_{72}$ and $C_{73}$ outputted from the third sensor units 12 and 73. Except for these features, the touch panel device shown in FIG. 12 is the same as the touch panel device shown in FIG. 11.

(2) Second Embodiment

Figure 13:
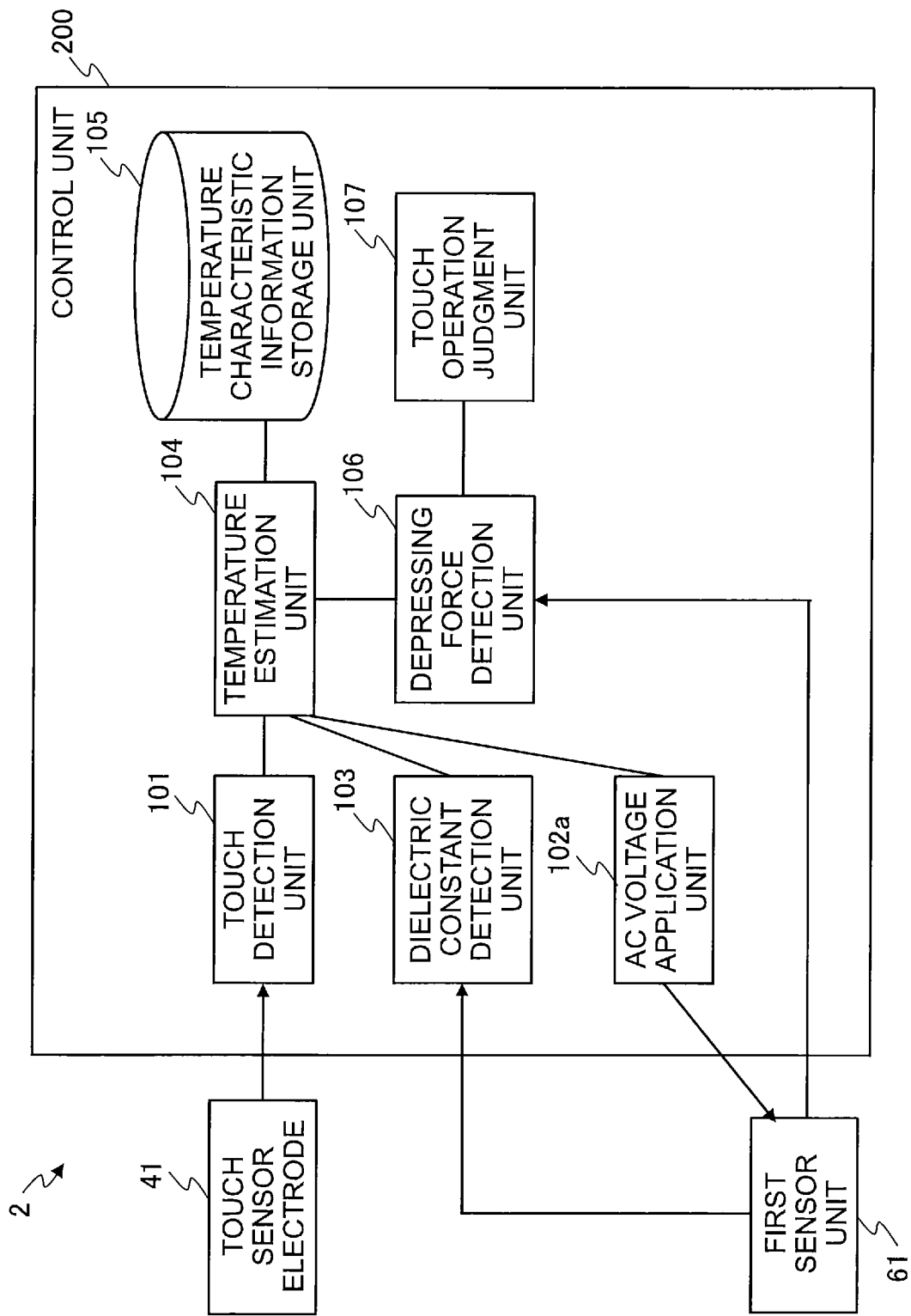
FIG. 13 is a functional block diagram schematically showing the configuration of a control unit of a touch panel device according to a second embodiment of the present disclosure.

FIG. 13 is a functional block diagram schematically showing the configuration of a control unit 200 of a touch panel device 2 according to a second embodiment. In FIG. 13, each component identical or corresponding to a component shown in FIG. 5 is assigned the same reference character as in FIG. 5. The control unit 200 of the touch panel device 2 differs front the control unit 100 shown in FIG. 5 in that an AC voltage application unit 102a is capable of switching a drive frequency to a plurality of frequencies.

Figure 14B:
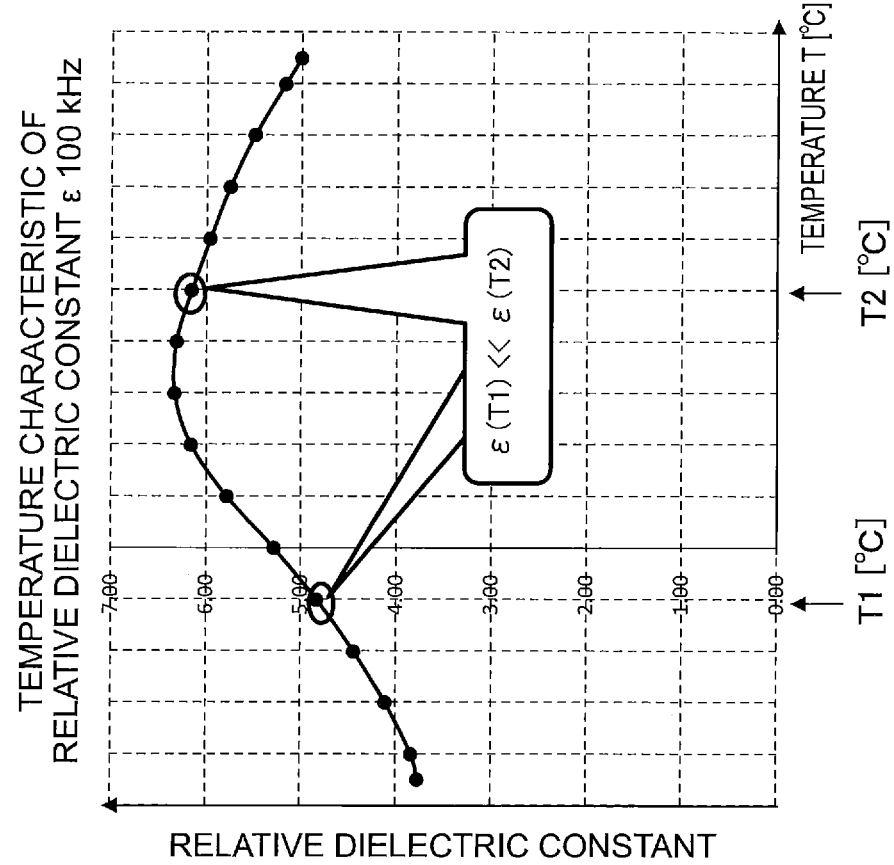
FIGS. 14A and 14B are graphs showing a temperature characteristic of a relative dielectric constant when 1 kHz AC voltage is applied and when 100 kHz AC voltage is applied.
Figure 14A:
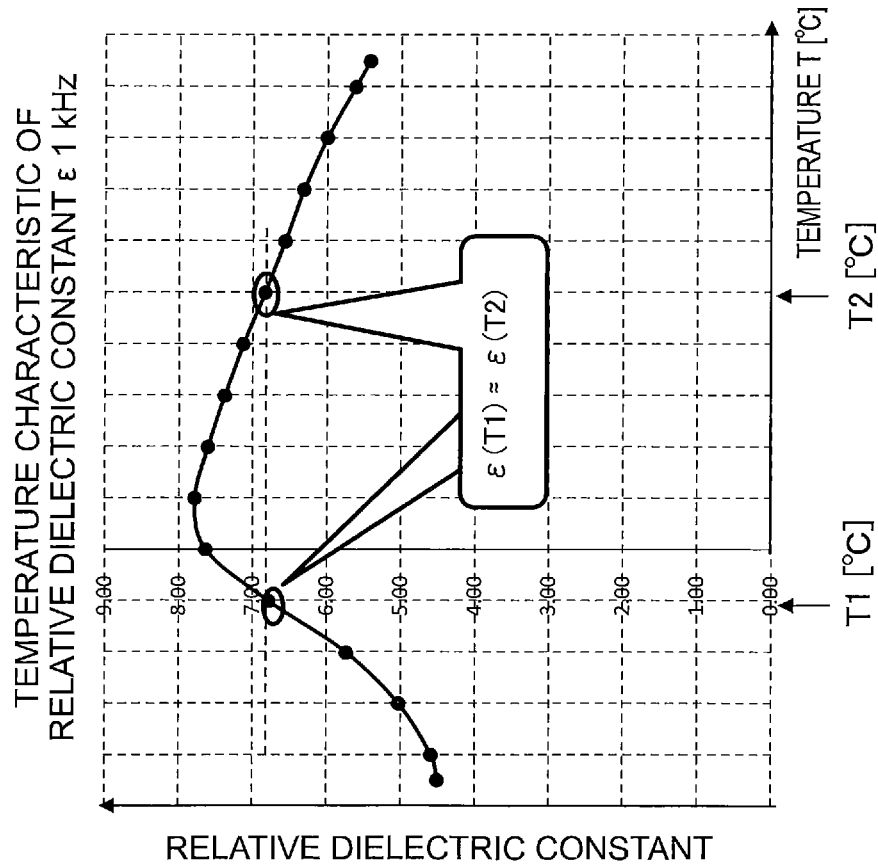

FIGS. 14A and 14B are graphs showing a temperature characteristic of a relative dielectric constant when an AC voltage at a drive frequency of 1 kHz is applied to the first sensor unit 61 and when an AC voltage at a drive frequency of 100 kHz is applied to the first sensor unit 61. As shown in FIGS. 14A and 14B, the temperature characteristic of the relative dielectric constant 8 of the adhesive agent 30 as the elastic merger obtained based on the capacitance detected by the first sensor unit 61 changes depending on the frequency of the AC voltage applied to the first sensor unit 61. For example, in the case of FIG. 14A, the relative dielectric constant ε(T1) when the temperature is T1 [° C.] and the relative dielectric constant ε(T2) when the temperature is T2 [° C.] are almost the same value ε(T12). Thus, when the relative dielectric constant ε(T12) is detected by the dielectric constant detection unit 103, the temperature estimation unit 12 obtains two temperatures T1 [° C.] and T2 [° C.] as the estimation result. Therefore, in the second embodiment, the relative dielectric constant ε(T1) when the temperature is T1 [° C.] and the relative dielectric constant ε(T2) when the temperature is T2 [° C.] are obtained in the case of FIG. 14B. In the case of FIG. 14B, ε(T1)<<ε(T2) holds. The temperature estimation unit 104 is capable of distinguishing between the two temperatures T1 [° C.] and T2 [° C.].

Figure 15:
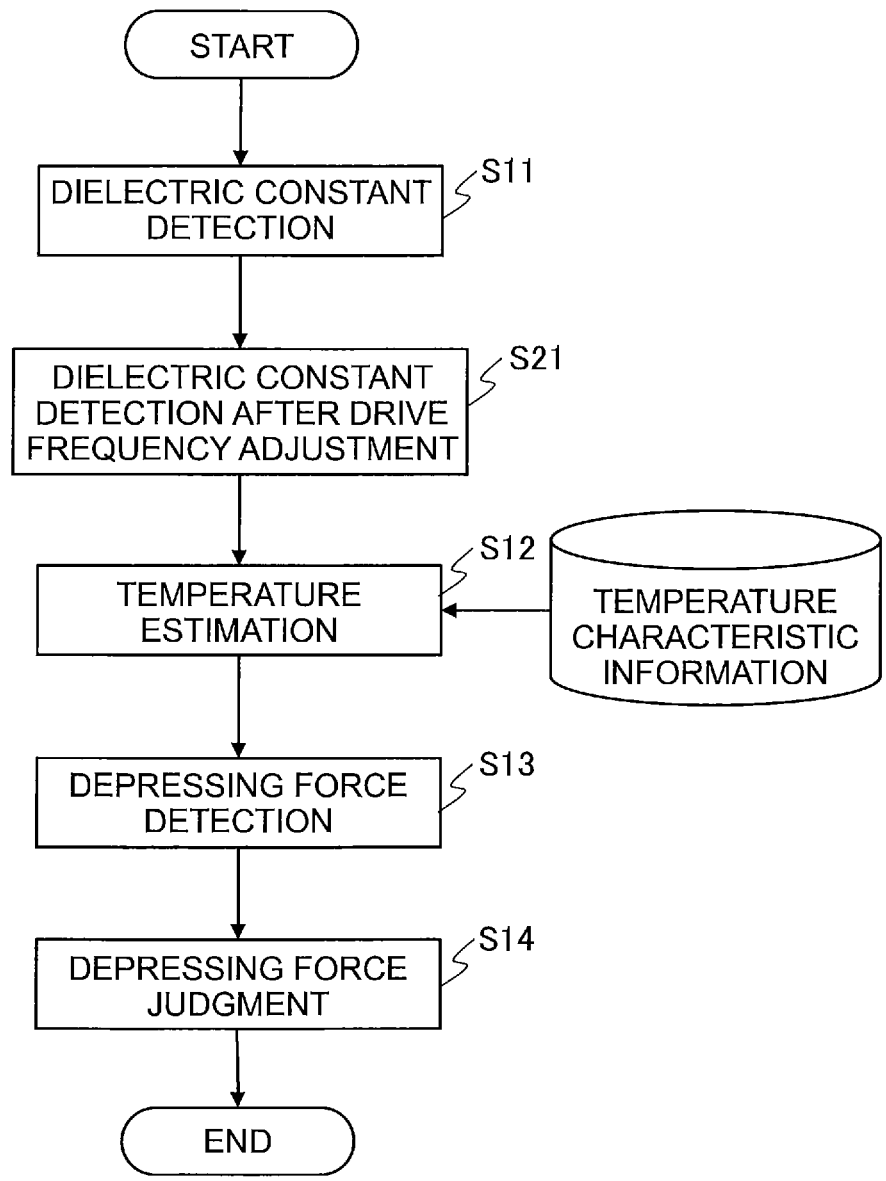
FIG. 15 is a flowchart showing the operation of the touch panel device according to a second embodiment.

FIG. 15 is a flowchart showing the operation of the touch panel device 2. As shown in FIG. 15, in step S11, the dielectric constant detection unit 103 detects the dielectric constant of the adhesive agent 30 based on the capacitance $C_{61}$ detected by the first sensor unit 61 in a state in which the AC voltage at a first drive frequency is applied thereto and provides the temperature estimation unit 104 with the detected dielectric constant. In step S21, the dielectric constant detection unit 103 detects the dielectric constant of the adhesive agent 30 based on the capacitance $C_{61}$ detected by the first sensor unit 61 in a state in which the AC voltage at a second drive frequency different from the first drive frequency is applied thereto and provides the temperature estimation unit 104 with the detected dielectric constant. In the next step S12, the temperature estimation unit 104 estimates the temperature of the adhesive agent 30 based on the received dielectric constants and the temperature characteristic information and provides the depressing force detection unit 106 with the estimated temperature. The processing in the subsequent steps S13 and S14 is the same as that in FIG. 3.

As described above, with the touch panel device 2 according to the second embodiment, the detection error of the depressing force due to temperature variations can be reduced. Further, the erroneous judgments in touch operations can be reduced since the temperature can be estimated accurately even in oases where the temperature characteristic of the relative dielectric constant of the adhesive agent 30 as the elastic member is not monotonically increasing or monotonically decreasing.

Except for the above-described features, the second embodiment is the same as the first embodiment.

(3) Third Embodiment

FIG. 16A is a cross-sectional view schematically showing the structure of a touch panel device 3 according to a third embodiment, and FIGS. 16B and 16C are diagrams showing a differential circuit included in a dielectric constant comparison unit 301. The structure shown in FIG. 16A is the same as the structure in FIG. 11. The touch panel device 3 according to the third embodiment includes the first sensor unit 61 and the second sensor unit 71. Each of $C_{p0}$ and $C_{p1}$ is a capacitance determined by the distance between electrodes and the dielectric constant. Each of $C_{R0}$ and $C_{R1}$ represents an electrical charge that is accumulated by charging shown in FIG. 16B.

Figure 17:
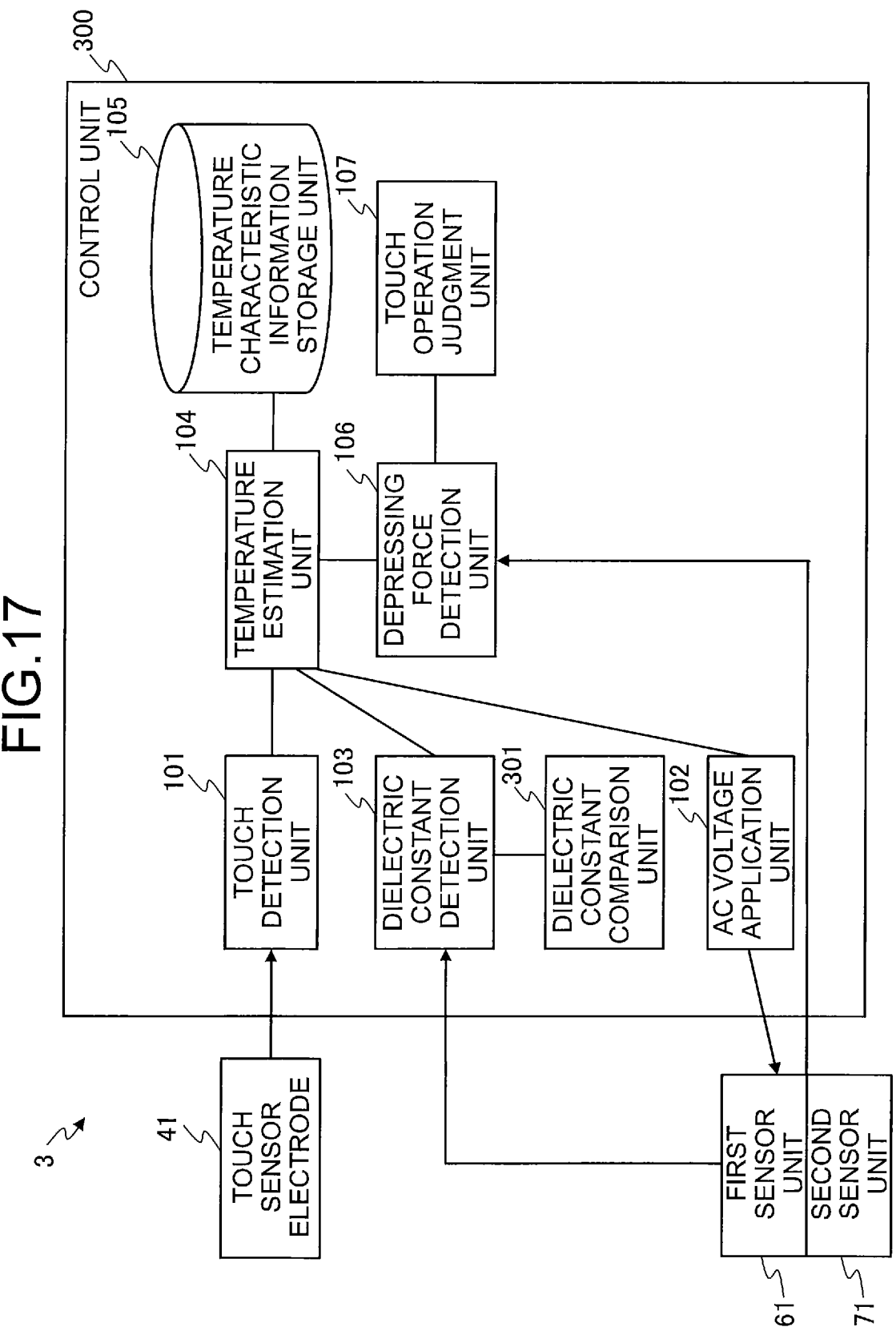
FIG. 17 is a functional block diagram schematically showing the configuration of a control unit of the touch panel device according to the third embodiment.

FIG. 17 is a functional block diagram schematically showing the configuration of a control unit 300 of the touch panel device 3 according to the third embodiment. In FIG. 17, each component identical or corresponding to a component shown in FIG. 5 is assigned the same reference character as in FIG. 5. The control unit 300 of the touch panel device 3 differs from the control unit 100 shown in FIG. 5 in including the dielectric constant comparison unit 301 and in that the temperature estimation unit 104 estimates the temperature based on a difference in the dielectric constant.

For the calculation of the difference in the dielectric constant, the charging is done for an electrical charge corresponding to $(C_{R1}+C_{p1})$ and an electrical charge corresponding to $(C_{R0}+C_{p0})$ as shown in FIG. 16B, and thereafter a difference $(V_1-V_0)$ between a voltage $V_1$ and a voltage $V_0$ when both electrical charges have been discharged as shown in FIG. 16C is outputted. The temperature estimation unit 104 estimates the temperature based on the difference $(V_1-V_0)$.

Figure 19:
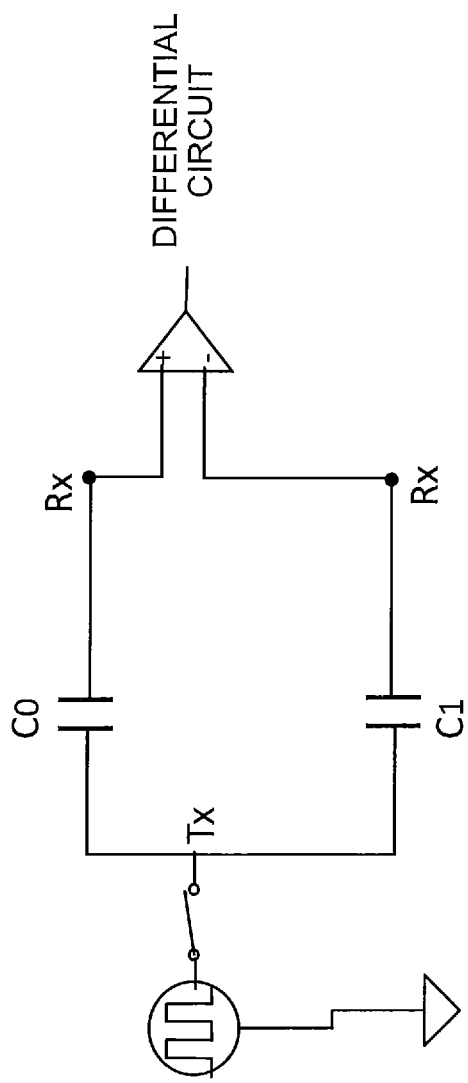
FIG. 19 is a diagram showing the operation of a differential circuit used in the touch panel device of FIGS. 18A and 18B.

FIGS. 18A and 18B are cross-sectional views schematically showing another example of the structure of the touch panel device 3 according to the third embodiment. The structure shown in FIGS. 18A and 18B is the same as the structure in FIG. 11. FIG. 19 is a diagram showing different structure of the dielectric constant comparison unit 301. In this example, a difference between a capacitance $C_0$ and a capacitance $C_1$ is obtained while an applying AC voltage to the second displacement detection electrode 61b and the fourth displacement detection electrode 71b. As shown in FIG. 19, the change in the capacitance $C_1$ due to a temperature change is greater than the change in the capacitance $C_0$. Further, when a depressing force, is applied to the operation surface 11, $C_0 > C_1$ holds. Furthermore, when no depressing force is applied, $(C_0-C_1)$ is constant. Therefore, when there is no touch operation, the control unit 300 is capable of obtaining the temperature from the capacitance difference $(C_0-C_1)$ in a state in which the capacitance difference $(C_0-C_1)$ changes slowly. Further, when there is a touch operation, the control unit 300 is capable of obtaining the depressing force from the capacitance difference $(C_0-C_1)$ in a state in which $(C_0-C_1)$ changes rapidly.

Figure 20:
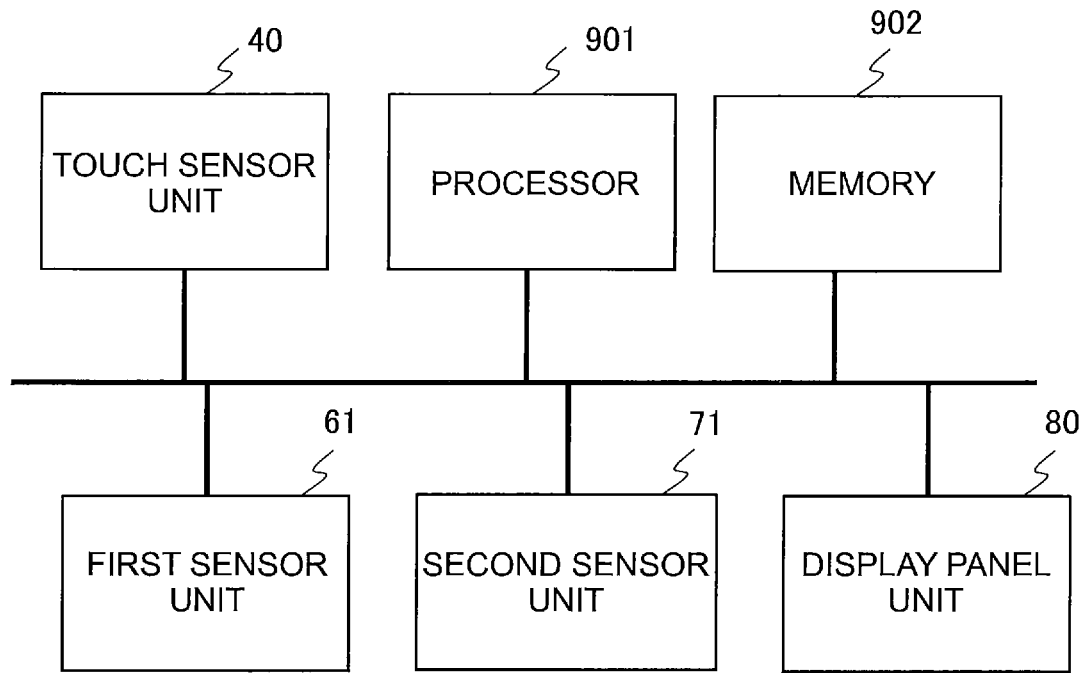
FIG. 20 is a diagram showing an example of the hardware configuration of the touch panel device according to the third embodiment.

FIG. 20 is a diagram showing an example of the hardware configuration of the touch panel device 3. The touch panel device 3 includes a memory 902 capable of storing a program and a processor 901 as an information processing unit that executes the program. The control unit 300 shown in FIG. 17 can be implemented by using the memory 902 as a storage device storing the program as software and the processor 901 as the information processing unit that executes the program stored in the memory 902.

Figure 21:
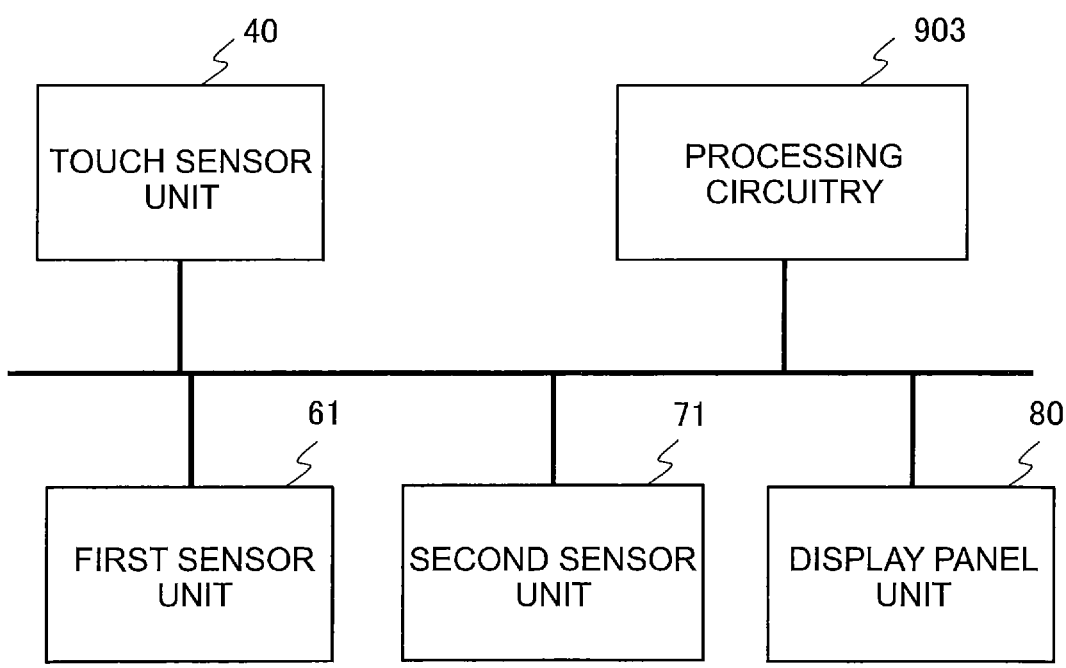
FIG. 21 is a diagram showing another example of the hardware configuration of the touch panel device according to the third embodiment.

FIG. 21 is a diagram showing another example of the hardware configuration of the touch panel device 3. The touch panel device 3 includes processing circuitry 903. The control unit 300 shown in FIG. 17 can be implemented by the processing circuitry 903. Incidentally, it is also possible to implement a part of the control unit 300 shown in FIG. 17 by using processing circuitry and implement the remaining part of the control unit 300 by using the memory 902 and the processor 901 shown in FIG. 20.

As described above, with the touch panel device 3 according to the third embodiment, the detection error of the depressing force due to temperature variations can be reduced. Accordingly, the erroneous judgments in touch operations can be reduced even in cases where the temperature variations are great.

Further, with the touch panel device 3 according to the third embodiment, influence of noise included in the detection value of the capacitance can be eliminated since the temperature is estimated based on the difference in the capacitance. Accordingly, the accuracy of the temperature estimation can foe increased and the erroneous judgments in touch operations can be reduced.

Except for the above-described features, the third embodiment is the same as the first embodiment.

(4) Fourth Embodiment

Figure 22A:
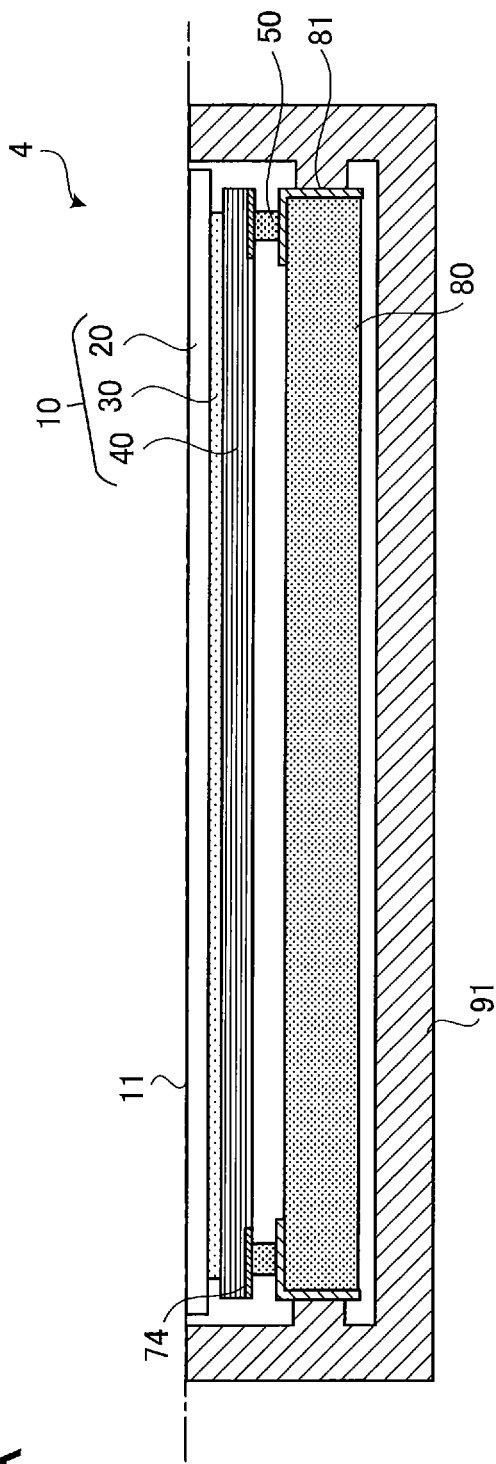
FIGS. 22A and 22B are cross-sectional views schematically showing the structure of a touch panel device according to a fourth embodiment of the present disclosure.
Figure 22B:
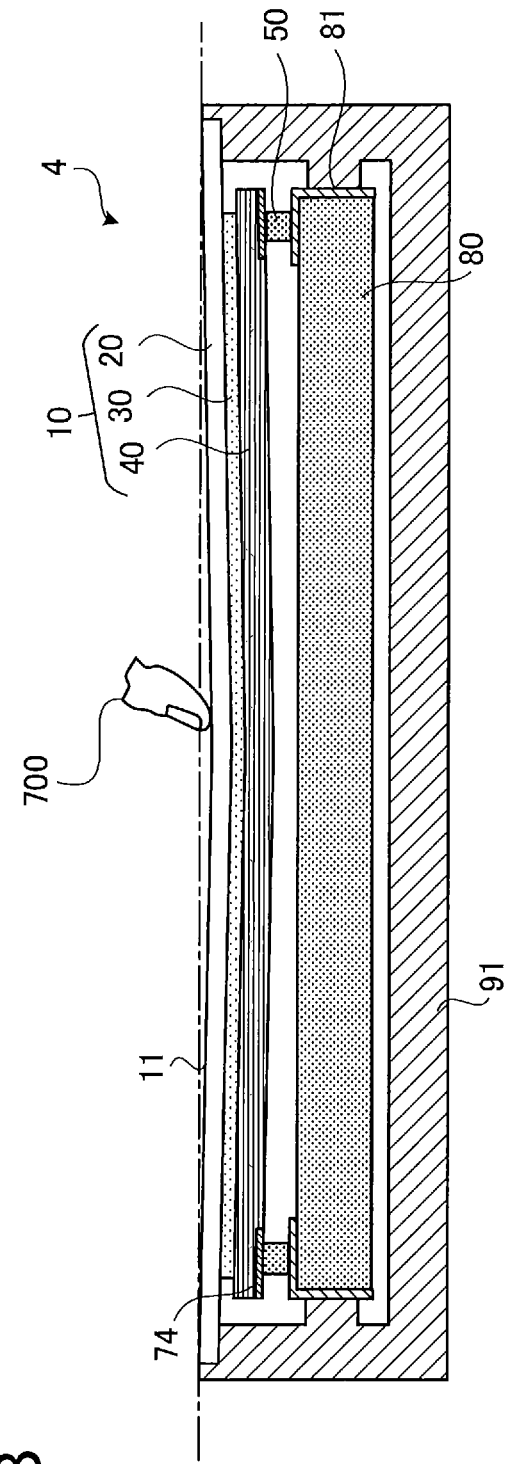
Figure 23:
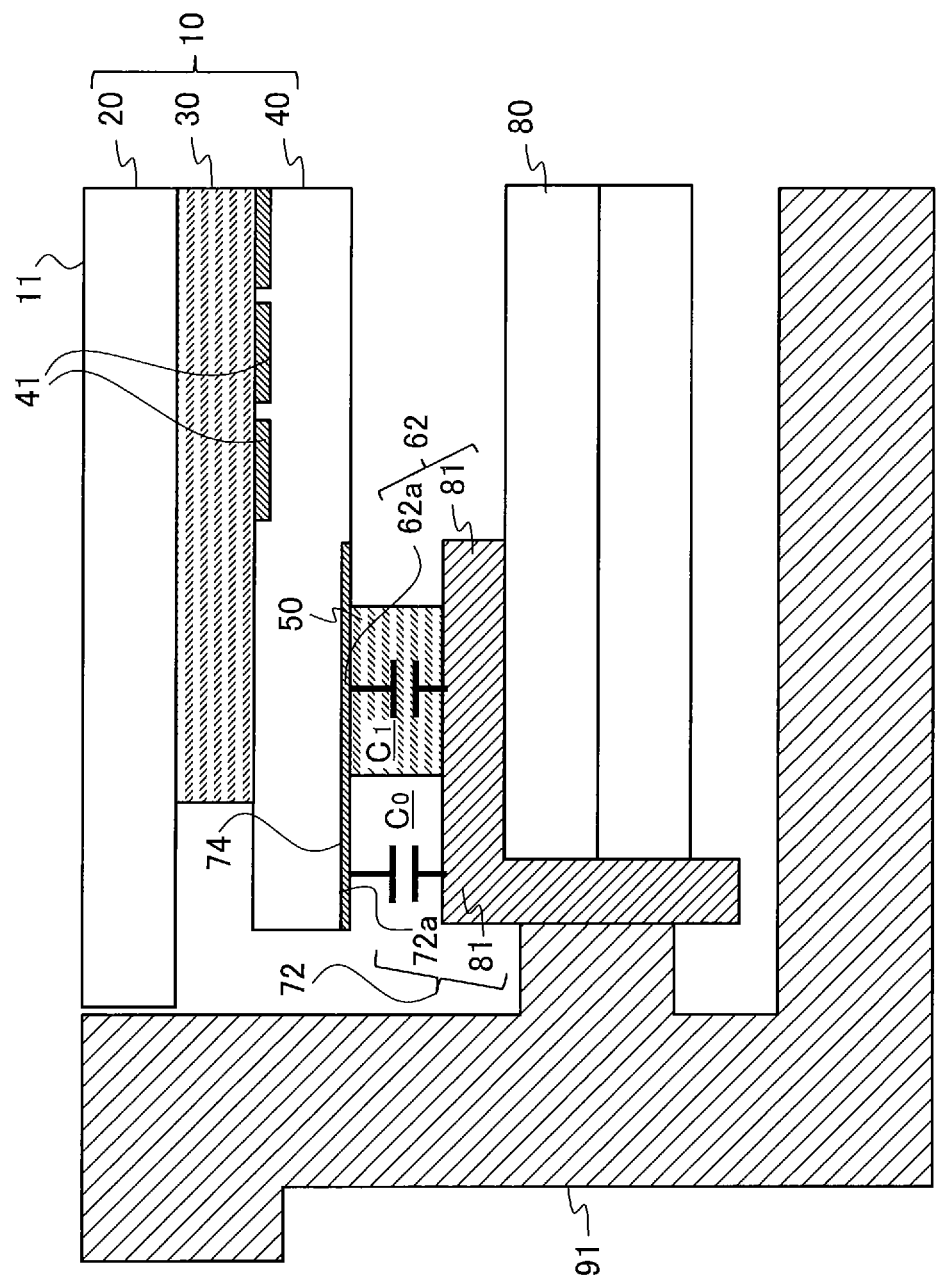
FIG. 23 is an enlarged sectional view schematically showing the structure of a principal part of the touch panel device according to the fourth embodiment.

FIGS. 22A and 22B are cross-sectional views schematically showing the structure of a touch panel device 4 according to a fourth embodiment. FIG. 22A shows a state in which no touch operation is being performed on the operation surface 11 of the touch panel device 4. FIG. 22B shows a state in which a touch operation is being performed while applying a depressing force to the operation surface 11 of the touch panel device 4 with the finger 700. FIG. 23 is an enlarged sectional view schematically showing the structure of a principal part of the touch panel device 4. FIG. 23 shows a state in which no touch operation is being performed on the operation surface 11 of the touch panel device 4.

The touch panel device 4 includes the cover panel 20, the touch sensor unit 40 and the adhesive agent 30. Further, the touch panel device 4 includes the display panel unit 80, the frame 81 included in the display panel unit 30, and the elastic material 50 as an elastic member provided between the display panel unit 80 and the touch panel unit 10. The elastic material 50 is a dielectric substance. The dielectric constant of the elastic material 50 changes corresponding to the temperature. The elastic material 50 is an elastic member that deforms due to the bending of the cover panel 20.

The cover panel 20 has the operation surface 11 on which a touch operation is performed by use of an electric conductor such as the finger 700. As shown in FIG. 22B, the cover panel 20 bends corresponding to the depressing force applied to the operation surface 11. In other words, the whole of the cover panel 20 slightly curves corresponding to the depressing force applied to the operation surface 11. In the fourth embodiment, the cover panel 20 is not supported by a housing 91, whereas the frame 81 and the display panel unit 80 are supported by the housing 91. The structure in which the housing 91 supports the frame 81 and the display panel unit 80 is referred to also as side mount structure.

As shown in FIGS. 22A and 22B and FIG. 23, the touch panel device 4 includes the first sensor unit 62 and the third sensor unit 72. The first sensor unit 62 includes a first capacitance sensor that detects the capacitance $C_{62}$ that changes depending on the dielectric constant of the elastic material 50 and the thickness of the elastic material 50. The first sensor unit 62 includes a first displacement detection electrode 62a (i.e., a transmissive conductive film 74) and a second displacement detection electrode (i.e., the frame 81) arranged at positions to face each other across the elastic material 50. The first displacement detection electrode 62a and the second displacement detection electrode are formed with ITO, for example. The third sensor unit 72 includes a fifth displacement detection electrode 72a (i.e., the transmissive conductive film 74) and a sixth displacement detection electrode (i.e., the frame 81) arranged at positions to face each other across a space adjoining the elastic material 50. The fifth displacement detection electrode 72a and the sixth displacement detection electrode are formed with ITO, for example.

Figure 24:
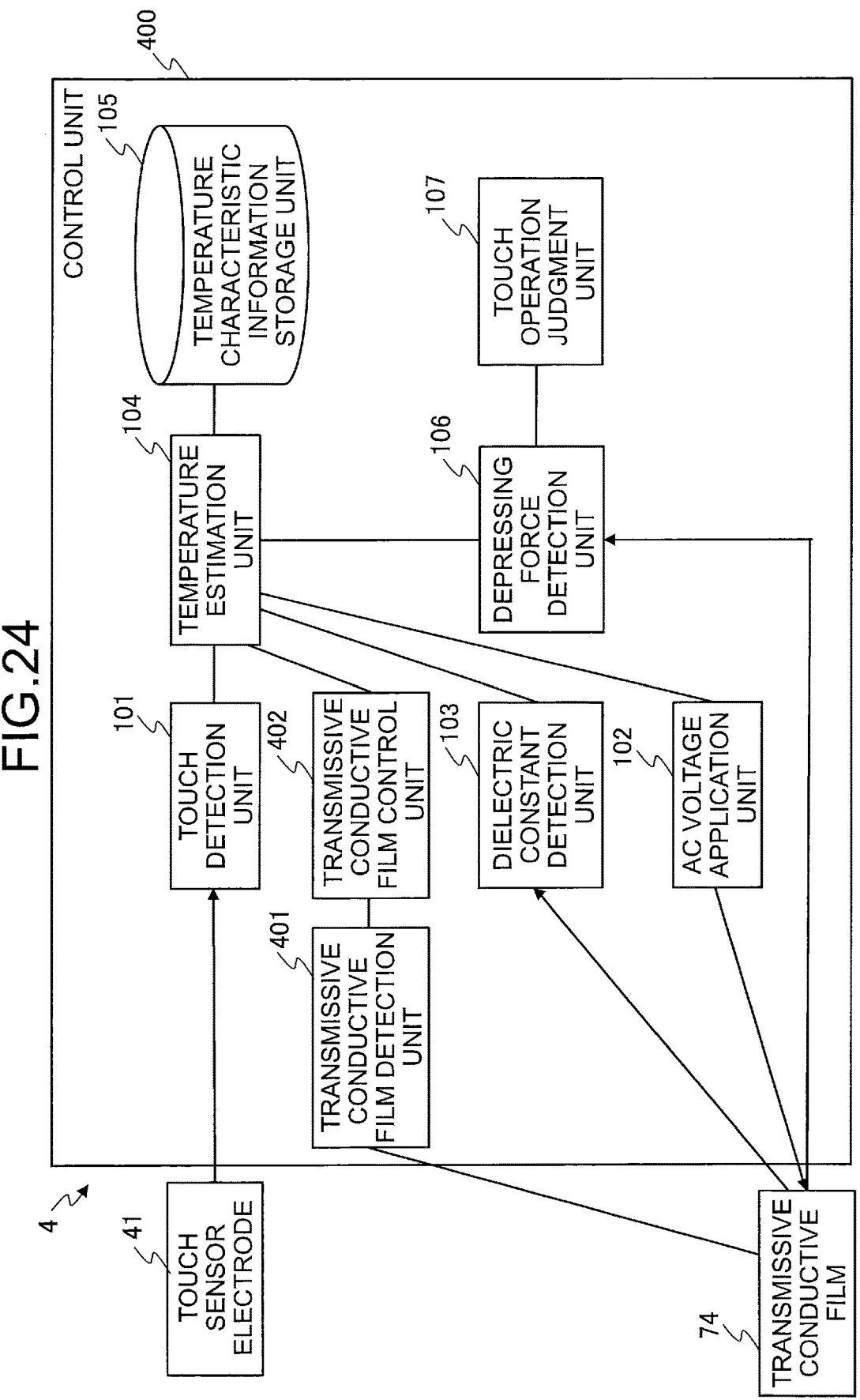
FIG. 24 is a functional block diagram schematically showing the configuration of a control unit of the touch panel device according to the fourth embodiment.

FIG. 24 is a functional block diagram schematically showing the configuration of a control unit 400 of the touch panel device 4. The touch panel device 4 includes the control unit 400. The control unit 400 is capable of executing a touch panel control method according to the fourth embodiment. The control unit 400 can also be a part of an information processing device such as a computer that executes a touch panel control program according to the fourth embodiment.

The control unit 400 differs from the control units in the first to third embodiments in including a transmissive conductive film detection unit 401 that detects the capacitance of the transmissive conductive film 74 and provides the temperature estimation unit 104 with the detection value of the capacitance and in including a transmissive conductive film control unit 402 that supplies electric power to the transmissive conductive film and thereby makes the transmissive conductive film 74 operate as a heater.

Figure 25:
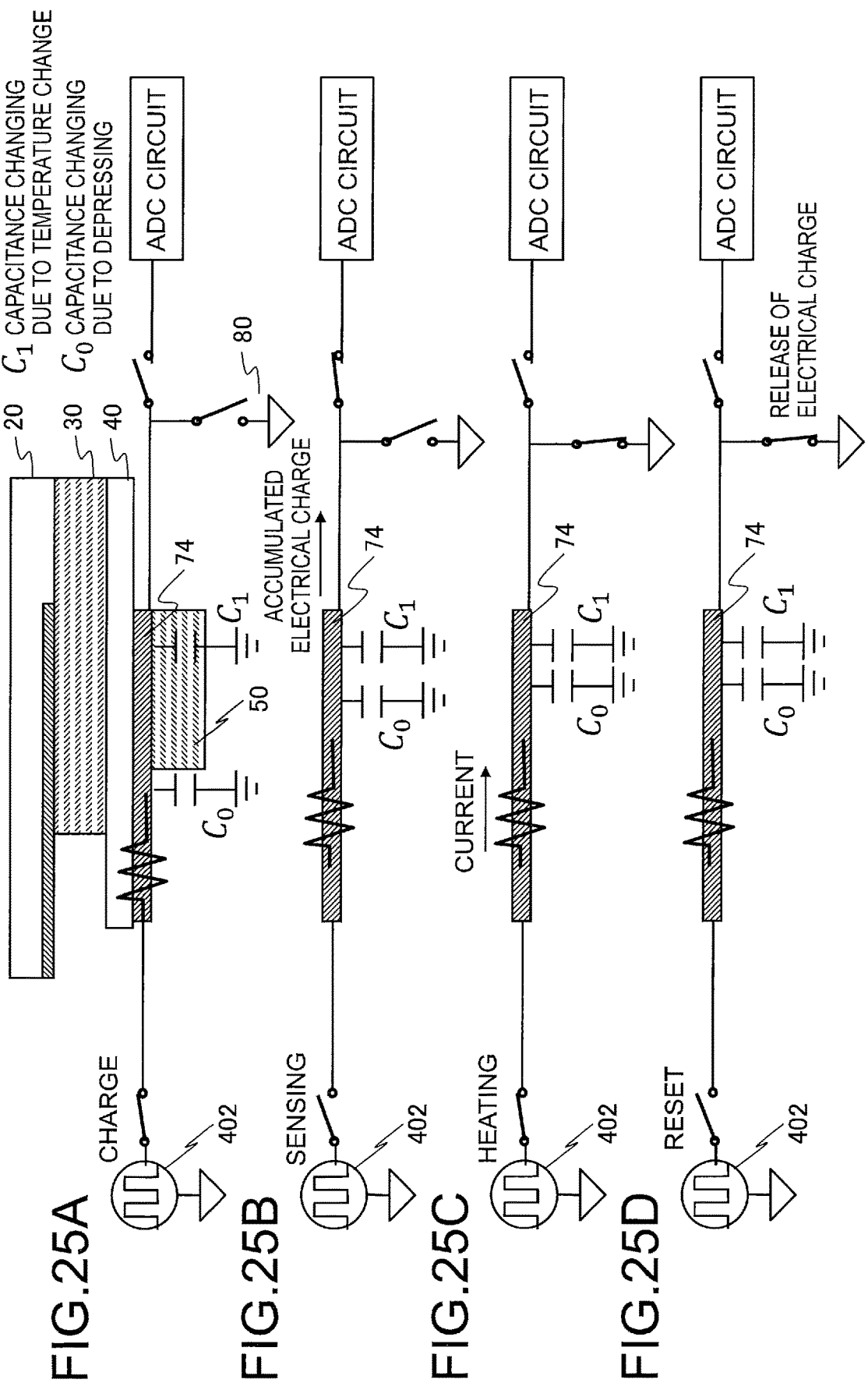
FIGS. 25A to 25D are diagrams showing the operation of the touch panel device according to the fourth embodiment.

FIGS. 25A to 25D are diagrams showing the operation of the touch panel device 4 according to the fourth embodiment. FIG. 25A shows an electrical charging operation and FIG. 25B shows a capacitance sensing operation. FIG. 25C shows a heating operation for making the transmissive conductive film 74 emit heat and FIG. 25D shows a reset operation. In the fourth embodiment, the transmissive conductive film 74 is charged with an electrical charge as shewn in FIG. 25A, and the electrical charge accumulated by the charging is outputted through an ADC (analog to digital converter) circuit as shewn in FIG. 258. The capacitance $C_1$ of the first sensor unit 62 is a capacitance that changes due to the temperature change. The capacitance $C_0$ of the third sensor unit 72 is a capacitance that changes depending on the depressing force. The temperature estimation unit 104 estimates the temperature based on the capacitance $C_1$. When the estimated temperature is less than a predetermined threshold temperature, the transmissive conductive film control unit 402 feeds electric current to the transmissive conductive film 74 and thereby makes the transmissive conductive film 74 emit heat as shown in FIG. 25C.

Figure 26:
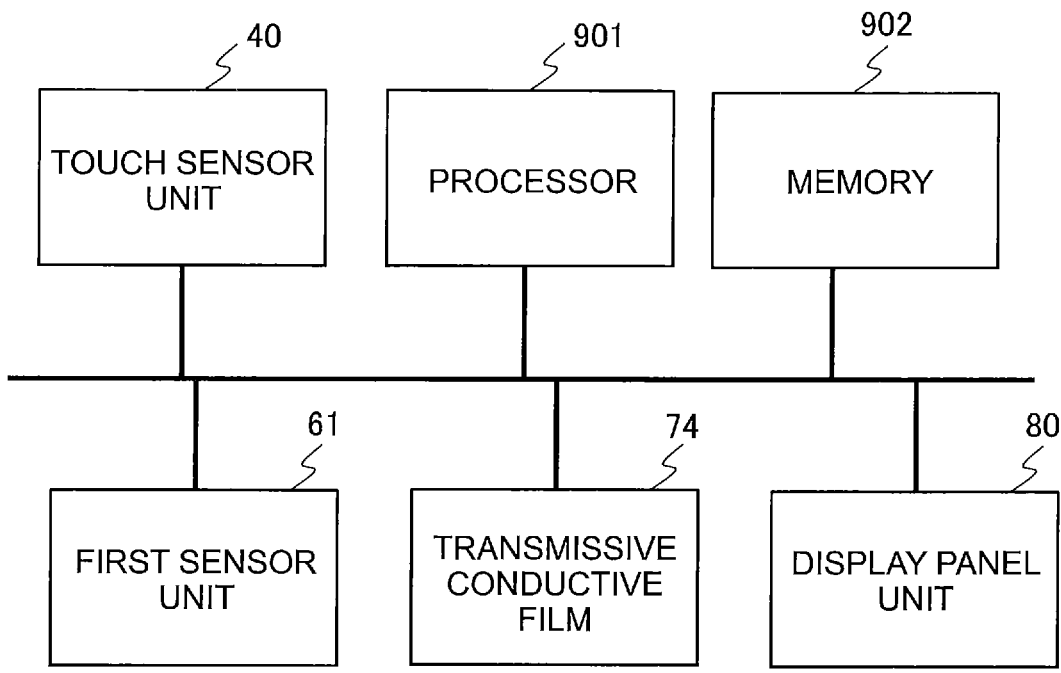
FIG. 26 is a diagram showing an example of the hardware configuration of the touch panel device according to the fourth embodiment.

FIG. 26 is a diagram showing an example of the hardware configuration of the touch panel device 4. The touch panel device 4 includes a memory 902 capable of storing a program and a processor 901 as an information processing unit that executes the program. The control unit 400 shown in FIG. 24 can be implemented by using the memory 902 as a storage device storing the program as software and the processor 901 as the information processing unit that executes the program stored in the memory 902.

Figure 27:
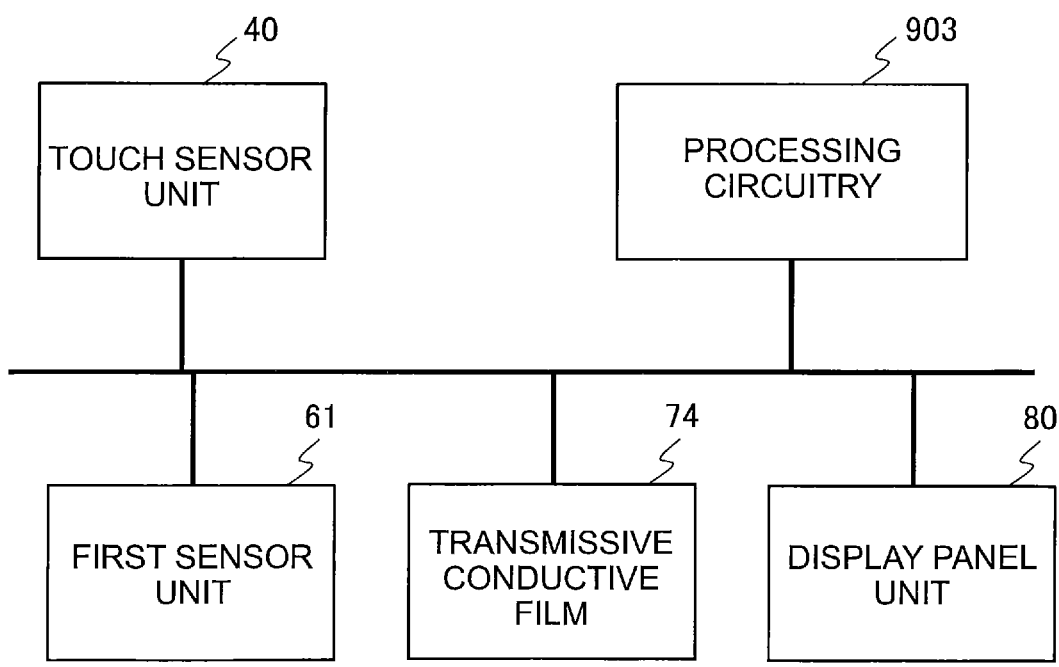
FIG. 27 is a diagram showing another example of the hardware configuration of the touch panel device according to the fourth embodiment.

FIG. 27 is a diagram showing another example of the hardware configuration of the touch panel device 4. The touch panel device 4 includes processing circuitry 903. The control unit 400 shown in FIG. 24 can be implemented by the processing circuitry 903 shown in FIG. 27. Incidentally, it is also possible to implement a part of the control unit 400 shown in FIG. 24 by using processing circuitry and implement the remaining part of the control unit 400 by using the memory 902 and the processor 901 shown in FIG. 26.

Figure 8:
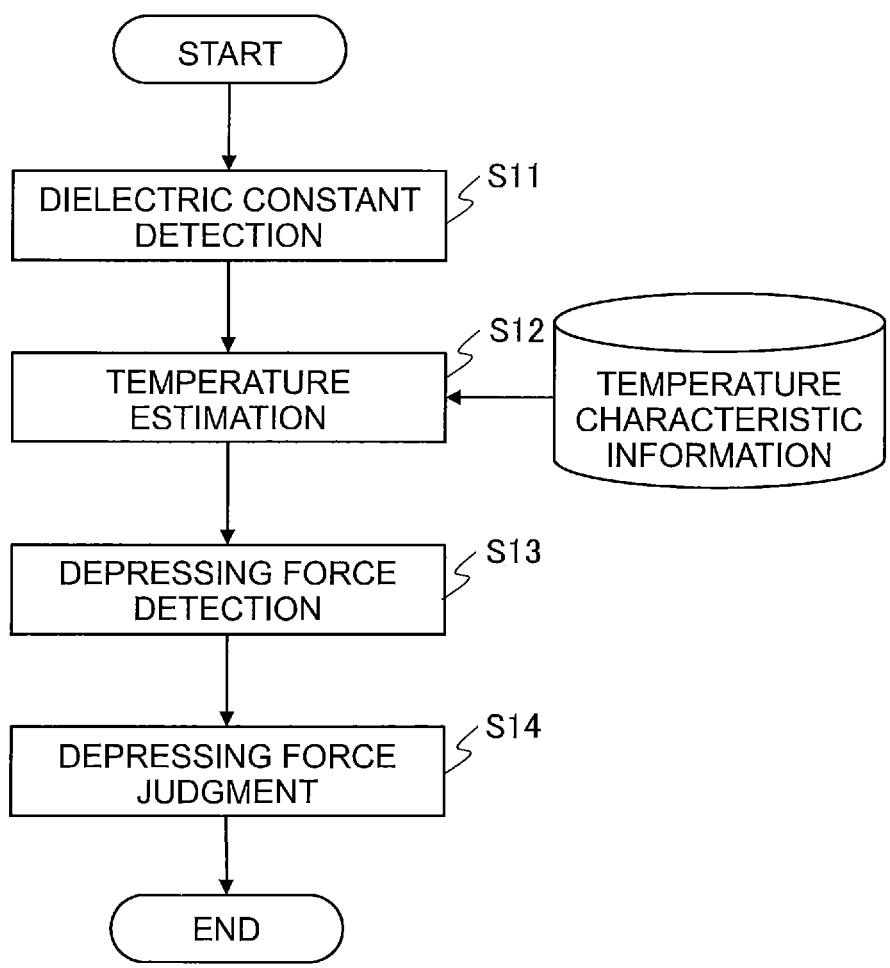
FIG. 8 is a flowchart showing the operation of the touch panel device according to the first embodiment.
Figure 28:
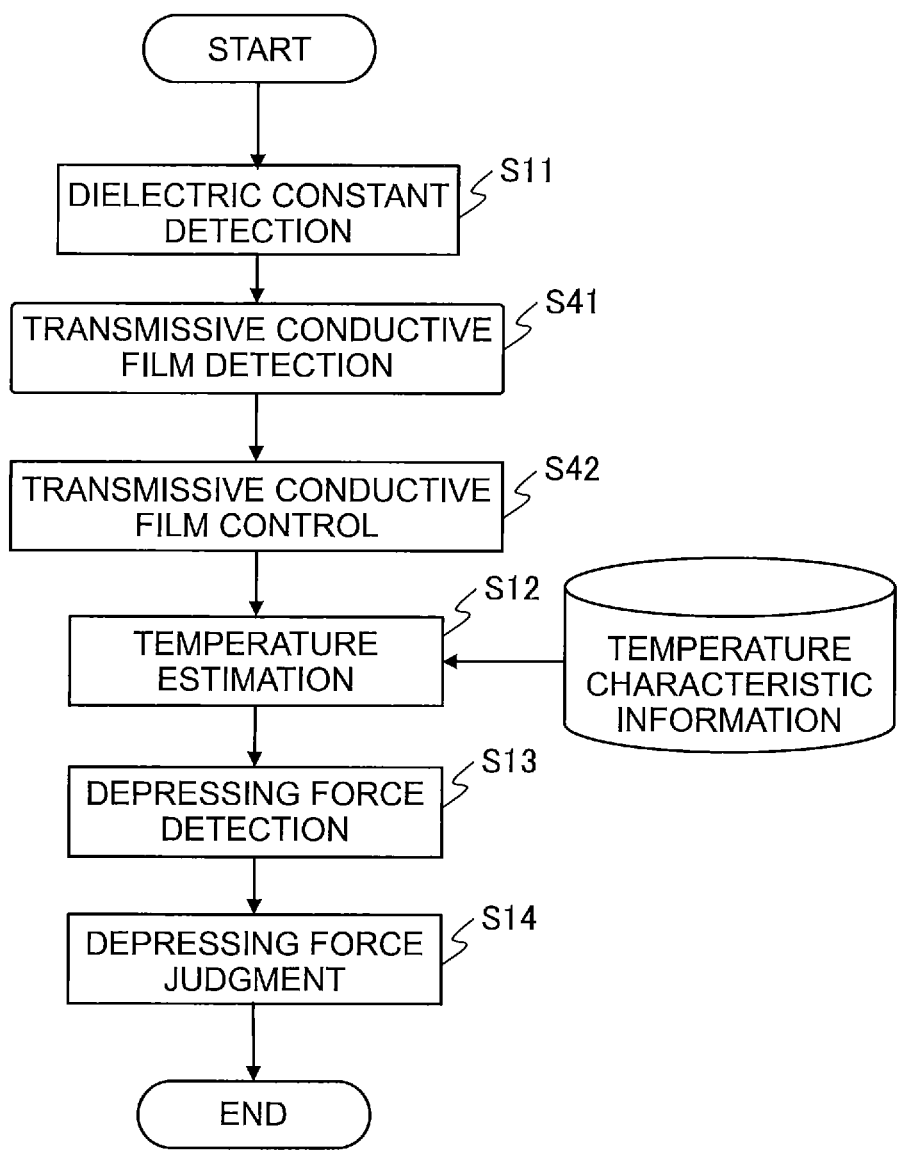
FIG. 28 is a flowchart showing the operation of the touch panel device according to the fourth embodiment.

FIG. 28 is a flowchart showing the operation of the touch panel device 4. As shown in FIG. 28, in step S11, the dielectric constant detection unit 103 detects the dielectric constant of the adhesive agent 50 based on the capacitance $C_1$ detected by the first sensor unit 62 in the state in which the AC voltage at the first drive frequency is applied thereto and provides the temperature estimation unit 104 with the detected dielectric constant. In step S41, the transmissive conductive film detection unit 401 detects the electrical charge with which the transmissive conductive film 74 has been charged by the processing shown in FIGS. 25A and 25B. In the next step S42, the transmissive conductive film control unit 402 supplies electric current to the transmissive conductive film 74 and thereby makes the transmissive conductive film 74 emit heat as shown in FIG. 25C. In the next step S12, the temperature estimation unit 104 estimates the temperature of the elastic material 50 based on the received dielectric constant and the temperature characteristic information and provides the depressing force detection unit 106 with the estimated temperature. The processing in the subsequent steps S13 and S14 is the same as that in FIG. 8.

As described above, with the touch panel device 4 according to the fourth embodiment, the detection error of the depressing force due to temperature variations can be reduced. Accordingly, the erroneous judgments in touch operations can be reduced even in cases where the temperature variations are great.

Further, by the operation of making the transmissive conductive film 74 emit heat, a temperature range in which the touch panel device 4 is usable can be expanded.

Except for the above-described features, the fourth embodiment is the same as any one of the first to third embodiments.

(5) Fifth Embodiment

Figure 29:
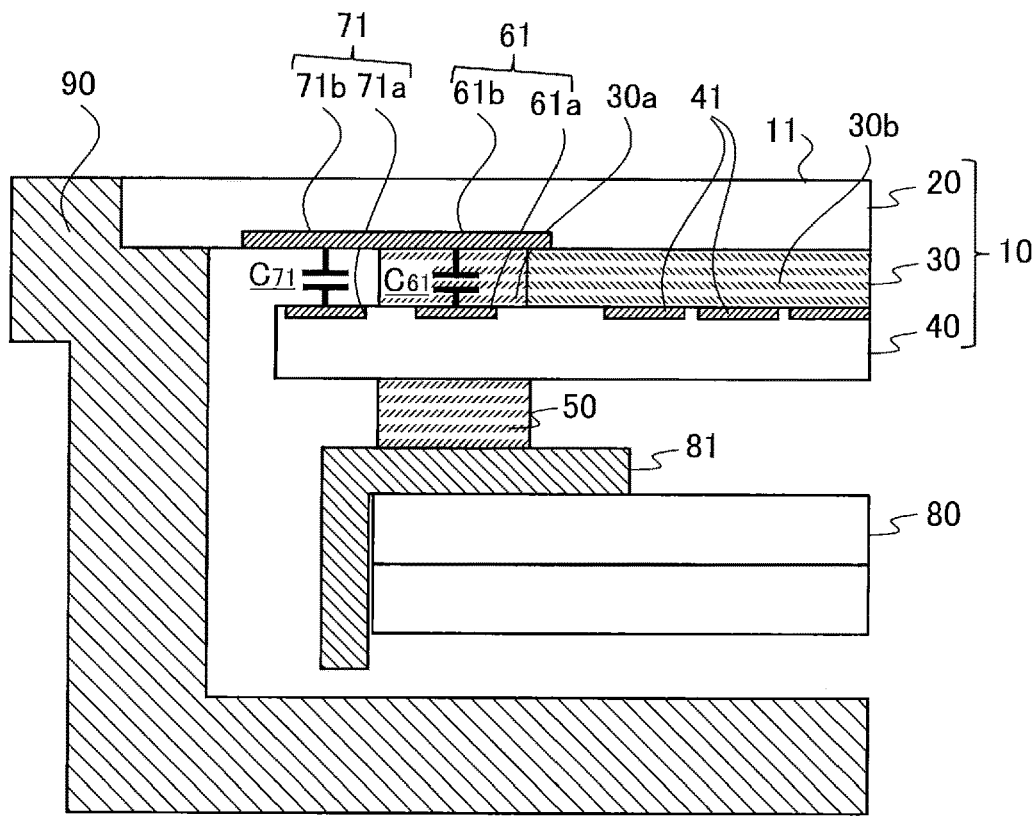
FIG. 29 is an enlarged sectional view schematically showing the structure of a principal part of the touch panel device according to a fifth embodiment.
Figure 30:
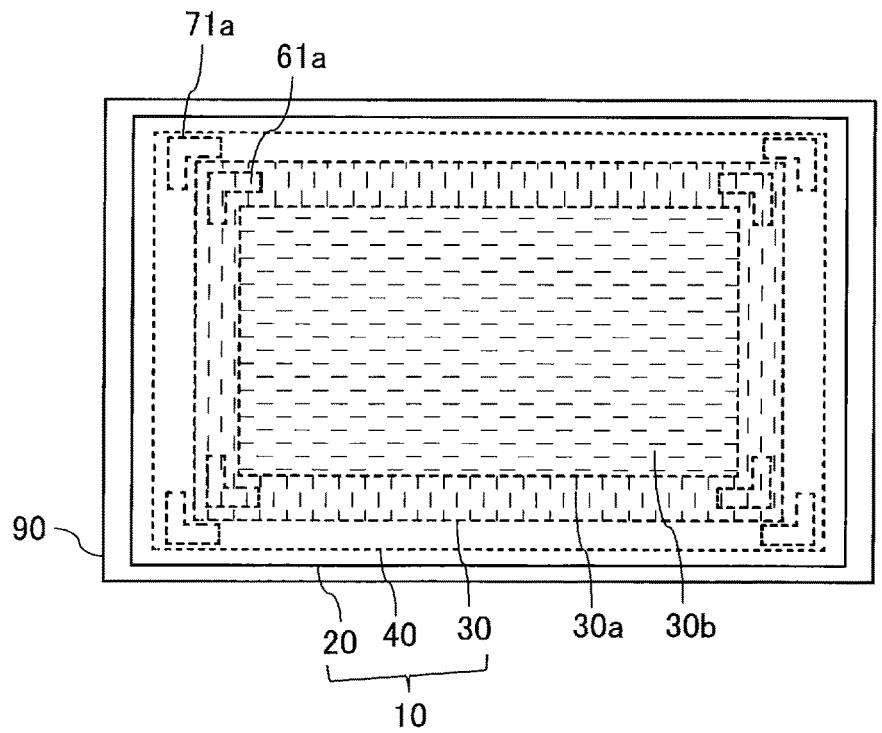
FIG. 30 is a plan view schematically showing the touch panel device according to the fifth embodiment.

FIG. 29 is an enlarged sectional view schematically showing the structure of a principal part of a touch panel device according to a fifth embodiment. In FIG. 29, each component identical or corresponding to a component shown in FIG. 11 is assigned the same reference character as in FIG. 11. FIG. 30 is a plan view schematically showing the touch panel device according to the fifth embodiment.

In the touch panel device according to the fifth embodiment, the adhesive agent 30 includes a first adhesive agent 30a arranged between the first displacement detection electrode 61a and the second displacement detection electrode 61b and a second adhesive agent 30b arranged between the cover panel 20 and the touch sensor electrode 41. Further, the adhesive agents used as the first adhesive agent 30a and the second adhesive agent 30b are adhesive agents satisfying a condition that the rate of change of the dielectric constant of the first adhesive agent 30a due to a temperature change is higher than the rate of change of the dielectric constant of the second adhesive agent 30b due to the temperature change. At the time of manufacture, as shown in FIG. 30, an adhesive agent sheet in a shape like a rectangular frame as the first adhesive agent 30a is stuck on the touch sensor unit 40, thereafter a liquid adhesive agent is poured onto or applied on a central region of the frame-like adhesive agent sheet, and the cover panel 20 is stuck on the structure. The liquid adhesive agent is OCR (Optical Clear Resin), for example.

By using an adhesive agent whose rate of change of the dielectric constant due to a temperature change is high as the first adhesive agent 30a, the accuracy of the temperature detection by the first sensor unit 61 can be increased.

Further, by using an adhesive agent whose rate of change of the dielectric constant due to a temperature change is low as the second adhesive agent 30b, the influence of the temperature on the touch operation detection by the touch sensor electrodes 41 can be reduced and the accuracy of the touch operation detection can be increased.

Incidentally, except for the above-described features, the fifth embodiment is the same as any one of the first to fourth embodiments.

Further, the touch panel device according to the fifth embodiment may also be configured not to include the second sensor unit 71. Furthermore, the touch panel device according to the fifth embodiment may also be configured to include another capacitance sensor such as the third sensor unit 72 or 73 and use the capacitance sensor for detecting the temperature.

(6) Modification

Each of the first to fifth embodiments is applicable to both the compression mount structure and the side mount structure. Further, it is possible to appropriately combine the configurations of the first to fifth embodiments.

DESCRIPTION OF REFERENCE CHARACTERS 1-4: touch panel device, 10: touch panel unit, 11: operation surface, 20: cover panel, 30: adhesive agent, 40: touch sensor unit, 41: touch sensor electrode, 50: elastic material, 61, 62: first sensor unit, 61a, 62a: first displacement detection electrode, 61b: second displacement detection electrode, 71: second sensor unit, 71a: third displacement detection electrode, 71b: fourth displacement detection electrode, 72, 73: third sensor unit, 72a: fifth displacement detection electrode, 73a: seventh displacement defection electrode, 74: transmissive conductive film, 80: display panel unit, 81: frame, 90, 91: housing, 100, 200, 300, 400: control unit, 101: touch detection unit, 102, 102a: AC voltage application unit, 103: dielectric constant detection unit, 104: temperature estimation unit, 105: temperature characteristic information storage unit, 106: depressing force detection unit, 107: touch operation judgment unit, 301: dielectric constant comparison unit, 401: transmissive conductive film detection unit, 402: transmissive conductive film control unit.

What is claimed is:

1. A touch panel device comprising:
a cover panel that has an operation surface on which a touch operation is performed and bends corresponding to a depressing force applied to the operation surface;
a touch sensor unit including touch sensor electrodes that output touch sensor signals corresponding to the touch operation;
a first elastic member integrally formed of an adhesive agent that has a dielectric constant changing corresponding to a temperature and deforms due to the bending of the cover panel, the elastic member being provided between the cover panel and the touch sensor unit;
a first sensor unit that includes respective electrodes adjacent to top and bottom surfaces of the first elastic member to detect a capacitance changing depending on the dielectric constant and a thickness of the first elastic member; and
processing circuitry
to estimate the temperature based on the capacitance detected by the first sensor unit;
to detect the depressing force based on the estimated temperature and the capacitance detected by the first sensor unit; and
to execute processing of the touch sensor signals based on the detected depressing force.

2. The touch panel device according to claim 1, further comprising a display panel unit that displays an image, wherein a second elastic member that includes an elastic material is provided between the display panel unit and the touch sensor unit.

3. A touch panel device comprising:
a cover panel that has an operation surface on which a touch operation is performed and bends corresponding to a depressing force applied to the operation surface;

a touch sensor unit including touch sensor electrodes that output touch sensor signals corresponding to the touch operation;

an elastic member integrally formed of an elastic material that has a dielectric constant changing corresponding to a temperature and deforms due to the bending of the cover panel;

a first sensor unit that includes respective electrodes adjacent to top and bottom surfaces of the elastic member to detect a capacitance changing depending on the dielectric constant and a thickness of the elastic member;

processing circuitry to estimate the temperature based on the capacitance detected by the first sensor unit;

to detect the depressing force based on the estimated temperature and the capacitance detected by the first sensor unit; and to execute processing of the touch sensor signals based on the detected depressing force; and a display panel unit that displays an image, wherein the elastic member is provided between the display panel unit and the touch sensor unit.

4. The touch panel device according to claim 1, wherein the first sensor unit includes a first capacitance sensor, and the first capacitance sensor includes a first displacement detection electrode and a second displacement detection electrode arranged at positions to face each other across the adhesive agent.

5. The touch panel device according to claim 2, wherein the first sensor unit includes a second capacitance sensor, and the second capacitance sensor includes a third displacement detection electrode and a fourth displacement detection electrode arranged at positions to face each other across the elastic material.

6. The touch panel device according to claim 2, wherein the first sensor unit includes a first capacitance sensor and a second capacitance sensor, the first capacitance sensor includes a first displacement detection electrode and a second displacement detection electrode arranged at positions to face each other across the adhesive agent, and the second capacitance sensor includes a third displacement detection electrode and a fourth displacement detection electrode arranged at positions to face each other across the elastic material.

7. The touch panel device according to claim 4, wherein the adhesive agent includes:

a first adhesive agent arranged between the first displacement detection electrode and the second displacement detection electrode; and a second adhesive agent arranged between the cover panel and the touch sensor electrode, and a rate of change of the dielectric constant of the first adhesive agent due to a temperature change is higher than a rate of change of the dielectric constant of the second adhesive agent due to the temperature change.

8. The touch panel device according to claim 1, further comprising a second sensor unit that detects a capacitance changing depending on a distance between the cover panel and the touch sensor unit, wherein the processing circuitry detects the depressing force based on the temperature, estimated based on the capacitance detected by the first sensor unit, and the capacitance detected by the second sensor unit.

9. The touch panel device according to claim 4, further comprising a second sensor unit that detects a capacitance changing depending on a distance between the cover panel and the touch sensor unit, wherein the processing circuitry estimates the temperature based on a difference between the capacitance detected by the first sensor unit and the capacitance detected by the second sensor unit.

10. The touch panel device according to claim 2, further comprising a third sensor unit that detects a capacitance changing depending on a distance between the touch sensor unit and the display panel unit, wherein the processing circuitry detects the depressing force based on the temperature, estimated based on the capacitance detected by the first sensor unit, and the capacitance detected by the third sensor unit.

11. The touch panel device according to claim 2, further comprising a third sensor unit that detects a capacitance changing depending on a distance between the touch sensor unit and the display panel unit, wherein the processing circuitry estimates the temperature based on a difference between the capacitance detected by the first sensor unit and the capacitance detected by the third sensor unit.

12. The touch panel device according to claim 1, further comprising an AC voltage application unit that applies AC voltage to the first sensor unit.

13. The touch panel device according to claim 1, further comprising an AC voltage application unit that applies AC voltage at a plurality of predetermined drive frequencies to the first sensor unit.

14. The touch panel device according to claim 12, further comprising a transmissive conductive film control unit that supplies electric power for making the first sensor unit emit heat.

15. The touch panel device according to claim 1, further comprising a touch operation judgment unit that judges that the touch operation is a valid touch operation when the depressing force detected by the depressing force detection unit is greater than or equal to a predetermined threshold value.

16. A touch panel control method executed by a touch panel device that includes a cover panel that has an operation surface on which a touch operation is performed and bends corresponding to a depressing force applied to the operation surface, a touch sensor unit including touch sensor electrodes that output touch sensor signals corresponding to the touch operation, an elastic member integrally formed of an adhesive agent that has a dielectric constant changing corresponding to a temperature and deforms due to the bending of the cover panel, the elastic member being provided between the cover panel and the touch sensor unit, and a first sensor unit that includes respective electrodes adjacent to top and bottom surfaces of the elastic member to detect a capacitance changing depending on the dielectric constant and a thickness of the elastic member, comprising:

estimating the temperature based on the capacitance detected by the first sensor unit;

detecting the depressing force based on the estimated temperature and the capacitance detected by the first sensor unit; and executing processing of the touch sensor signals based on the detected depressing force.

17. A non-transitory computer-readable storage medium for storing a touch panel control program executed by a touch panel device that includes a cover panel that has an operation surface on which a touch operation is performed and bends corresponding to a depressing force applied to the operation surface, a touch sensor unit including touch sensor electrodes that output touch sensor signals corresponding to the touch operation, an elastic member integrally formed of an adhesive agent that has a dielectric constant changing corresponding to a temperature and deforms due to the bending of the cover panel, the elastic member being provided between the cover panel and the touch sensor unit, and a first sensor unit that includes respective electrodes adjacent to top and bottom surfaces of the elastic member to detect a capacitance changing depending on the dielectric constant and a thickness of the elastic member, wherein the touch panel control program causes the touch panel device to execute:
- estimating the temperature based on the capacitance detected by the first sensor unit;
- detecting the depressing force based on the estimated temperature and the capacitance detected by the first sensor unit; and
- executing processing of the touch sensor signals based on the detected depressing force.

\* \* \* \* \*